United States Patent
Vora et al.

(10) Patent No.: US 10,838,715 B1
(45) Date of Patent: Nov. 17, 2020

(54) EFFICIENT AUTOMATIC POPULATION OF DOWNGRADE RIGHTS OF LICENSED SOFTWARE

(71) Applicant: ServiceNow, Inc., Santa Clara, CA (US)

(72) Inventors: Nirali A. Vora, Milpitas, CA (US); Yiwen Wang, Santa Clara, CA (US); Colby Andrew Blakeman, Mountain View, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/402,714

(22) Filed: May 3, 2019

(51) Int. Cl.
G06F 9/44 (2018.01)
G06F 8/71 (2018.01)
G06F 8/61 (2018.01)
G06F 8/77 (2018.01)
G06F 8/75 (2018.01)

(52) U.S. Cl.
CPC ................ G06F 8/71 (2013.01); G06F 8/61 (2013.01); G06F 8/75 (2013.01); G06F 8/77 (2013.01)

(58) Field of Classification Search
CPC ....................................................... G06F 8/71
USPC ......................................................... 717/170
See application file for complete search history.

(56) References Cited

U.S. PATENT DOCUMENTS

| | | | |
|---|---|---|---|
| 6,321,229 B1 | 11/2001 | Goldman | |
| 6,735,701 B1 * | 5/2004 | Jacobson | H04L 29/06 726/1 |
| 7,062,683 B2 | 6/2006 | Warpenburg | |
| 7,139,737 B2 * | 11/2006 | Takahashi | G06F 21/10 705/59 |
| 7,197,431 B2 * | 3/2007 | Barritz | G06F 11/3419 702/186 |
| 7,197,466 B1 * | 3/2007 | Peterson | G06F 21/105 705/59 |
| 7,603,318 B1 * | 10/2009 | Colosso | G06Q 30/06 705/51 |
| 7,610,512 B2 | 10/2009 | Gerber | |
| 7,617,073 B2 | 11/2009 | Trinon | |

(Continued)

OTHER PUBLICATIONS

Anne-Lucie Vion. "Software Asset Management and Cloud Computing". Databases [cs.DB]. Université Grenoble Alpes, 2018. English. ffNNT : 2018GREAM019ff. fftel-01901991f.*

(Continued)

*Primary Examiner* — Francisco J Aponte
(74) *Attorney, Agent, or Firm* — Fletcher Yoder PC

(57) ABSTRACT

A software model specification for a software package can be associated with representation of a software downgrade definition. The software model specification can include a publisher of the software package, an application title of the software package, and the version of the software package. One or more entitlements for the software package can be obtained. Based on the software downgrade definition being associated with the software model specification, the software downgrade definition can be associated with the entitlement(s). Compliance of the installations of the software package with the entitlement(s) can be calculated, where the software downgrade definition can cause each of the entitlement(s) to be applicable to the installations of the version of the software package or one or more earlier versions of the software package.

17 Claims, 12 Drawing Sheets

(56) References Cited

U.S. PATENT DOCUMENTS

| | | | |
|---|---|---|---|
| 7,818,741 B1* | 10/2010 | Bourdev | G06F 21/105 717/174 |
| 7,890,802 B2 | 2/2011 | Gerber | |
| 7,945,860 B2 | 5/2011 | Vambenepe | |
| 7,966,398 B2 | 6/2011 | Wiles | |
| 8,224,683 B2 | 7/2012 | Manos | |
| 8,352,453 B2* | 1/2013 | Chatterjee | G06Q 10/06 707/707 |
| 8,489,616 B2* | 7/2013 | Mayo | G06F 8/62 707/748 |
| 8,646,093 B2 | 2/2014 | Myers | |
| 8,656,184 B2* | 2/2014 | Miyazawa | G06F 8/658 713/191 |
| 8,674,992 B2 | 3/2014 | Poston | |
| 8,725,647 B2* | 5/2014 | Disciascio | G06F 21/10 705/59 |
| 8,726,265 B2* | 5/2014 | Wang | G06F 21/57 717/170 |
| 8,875,301 B2* | 10/2014 | Lori | G06F 21/105 705/51 |
| 9,245,096 B2* | 1/2016 | Abuelsaad | G06F 21/10 |
| 9,742,949 B2* | 8/2017 | Manabe | H04N 1/00962 |
| 9,785,760 B2* | 10/2017 | Biswas | H04L 63/102 |
| 10,169,596 B2* | 1/2019 | Fuse | G06F 21/105 |
| 10,255,569 B2* | 4/2019 | D'Urso | G06Q 10/06311 |
| 10,282,699 B2* | 5/2019 | Fabjanski | G06Q 10/087 |
| 10,365,908 B2* | 7/2019 | Shepherd | G06F 8/71 |
| 10,387,927 B2* | 8/2019 | O'Connor | G06Q 30/06 |
| 10,482,219 B2* | 11/2019 | Fuse | G06F 21/105 |
| 10,621,313 B2* | 4/2020 | Terry | H04L 63/20 |
| 2002/0065780 A1* | 5/2002 | Barritz | G06Q 50/188 705/59 |
| 2005/0278395 A1* | 12/2005 | Sandaire | H04L 41/0853 |
| 2007/0288389 A1* | 12/2007 | Vaughan | G06F 21/10 705/59 |
| 2007/0289028 A1* | 12/2007 | Vaughan | G06F 21/105 726/30 |
| 2009/0037336 A1* | 2/2009 | Sunata | G06F 21/105 705/59 |
| 2009/0228982 A1* | 9/2009 | Kobayashi | G06F 21/105 726/26 |
| 2009/0260003 A1* | 10/2009 | Matsugashita | G06F 8/64 717/174 |
| 2011/0238710 A1* | 9/2011 | Barritz | G06F 21/105 707/803 |
| 2011/0246978 A1* | 10/2011 | Alfano | G06F 8/61 717/171 |
| 2012/0304248 A1* | 11/2012 | Watts | G06Q 30/06 726/1 |
| 2013/0144755 A1* | 6/2013 | Mowatt | G06Q 30/06 705/26.41 |
| 2016/0042159 A1* | 2/2016 | Vijay | G06F 21/10 726/29 |
| 2016/0364707 A1* | 12/2016 | Varma | G06F 21/50 |
| 2017/0149835 A1* | 5/2017 | Mitevski | H04L 63/108 |
| 2017/0308685 A1* | 10/2017 | Terry | G06F 21/52 |
| 2018/0096361 A1* | 4/2018 | Gilchrist | H04L 63/10 |
| 2018/0144108 A1* | 5/2018 | Sawai | G06Q 10/10 |
| 2018/0321927 A1* | 11/2018 | Borthakur | G06F 8/61 |
| 2018/0321928 A1* | 11/2018 | Borthakur | G06F 8/62 |
| 2018/0322599 A1* | 11/2018 | Srivastava | H04L 41/0853 |
| 2019/0102524 A1* | 4/2019 | Gilchrist | G06Q 30/0185 |
| 2019/0102849 A1* | 4/2019 | Bertot | G06F 3/0486 |
| 2019/0164242 A1* | 5/2019 | Zhang | G06Q 20/06 |
| 2019/0340557 A1* | 11/2019 | Faulhaber | G06F 21/10 |

OTHER PUBLICATIONS

SERVICENOW, "Madrid Software Asset Management" last updated Apr. 15, 2019.

* cited by examiner

SOFTWARE MODEL SPECIFICATION (SMS) USER INTERFACE 700

SMS IDENTIFIER 710: SOFTWARE MODEL 650
PUBLISHER 712: PUBLISHER1      APP TITLE 714: SP1
VERSION 716: YEAR Y4, LEVEL L1
ROOT DISCOVERY MAP 718: DMAP 602

SOFTWARE DOWNGRADE DEFINITION 720:

| PACKAGE | DMAP | PARENT DMAP | YEAR | LEVEL |
|---------|------|-------------|------|-------|
| SP1 | 602 | --- | Y4 | L1 |
| SP1 | 604 | 602 | Y3 | L1 |
| SP1 | 606 | 602 | Y4 | L2 |
| SP1 | 608 | 602 | Y4 | L3 |
| SP1 | 612 | 604 | Y2 | L1 |
| SP1 | 614 | 604 | Y3 | L2 |
| SP1 | 616 | 604 | Y3 | L3 |
| SP1 | 642 | 612 | Y1 | L1 |
| SP1 | 644 | 642 | Y2 | L2 |
| SP1 | 646 | 642 | Y2 | L3 |

UPDATE SEARCH 736

DELETE 730   ADD 732   UPDATE 734   RETRIEVE 738

FIG. 7A

ENTITLEMENT USER INTERFACE 750

ENTITLEMENT IDENTIFIER 760: ENTITLEMENT 660
LICENSE METRICS -- COUNT 762A: 10   UNITS 762B: USERS
LICENSE DURATION 764: PERPETUAL
ASSOCIATED SOFTWARE MODEL SPECIFICATION 766: SOFTWARE MODEL 650

RELATED SOFTWARE DOWNGRADE DEFINITION 768:

| PACKAGE | DMAP | PARENT DMAP | YEAR | LEVEL | USE DMAP? |
|---------|------|-------------|------|-------|-----------|
| SP1 | 602 | --- | Y4 | L1 | Y |
| SP1 | 604 | 602 | Y3 | L1 | Y |
| SP1 | 606 | 602 | Y4 | L2 | Y |
| SP1 | 608 | 602 | Y4 | L3 | Y |
| SP1 | 612 | 604 | Y2 | L1 | Y |
| SP1 | 614 | 604 | Y3 | L2 | Y |
| SP1 | 616 | 604 | Y3 | L3 | N |
| SP1 | 642 | 612 | Y1 | L1 | Y |
| SP1 | 644 | 642 | Y2 | L2 | N |
| SP1 | 646 | 642 | Y2 | L3 | Y |

SELECTOR 780

DELETE 770   ADD 772   UPDATE 774   RETRIEVE 776

EFFICIENT AUTOMATIC POPULATION OF DOWNGRADE RIGHTS OF LICENSED SOFTWARE

BACKGROUND

An enterprise may use a number of computing devices to efficiently facilitate and manage its interrelated operations. Each such computing device may have one or more software packages installed thereon. Where the software is proprietary, the enterprise may procure software licenses for at least some of the computing devices to allow the enterprise to use the software. The enterprise may maintain records of these software licenses so that the enterprise can properly track usage of multiple licenses based on the installations of the software packages.

SUMMARY

For large enterprises, managing licenses for each software package installed on each computing device involves more than just tracking usage of software packages. Rather, managing these licenses may involve understanding the hierarchical relationship between various versions of software packages.

The embodiments herein involve, but are not limited to, defining software model specifications and associated entitlements representing software licenses for the various versions of software packages. A software model specification can include information about a software package being licensed—a publisher (or vendor), an application title, a version, and one or more software downgrade definitions. The one or more software downgrade definitions can specify a hierarchy of downgrade rights for the version. An entitlement can represent a software license for a software package that can include license metric data specifying metrics and counts associated for the software license. The entitlement can refer to or be attached to a software model specification; e.g., to specify the software being licensed and related software downgrade definitions. Then, the entitlements representing software licenses for the various versions of a software package can be used to calculate compliance of installations of the software package in the managed network. In particular, the software downgrade definitions are used to select entitlements that are applicable to the installations of the various versions of the software package.

Accordingly, a first example embodiment may involve a computing system. The computing system may include persistent storage and one or more processors. The persistent storage may contain: (i) a plurality of software downgrade definitions, wherein a software downgrade definition thereof specifies a version of a software package and one or more earlier versions of the software package, and (ii) representations of installations of the software package in a managed network. The one or more processors may be configured to perform operations. These operations may include: associating a representation of the software downgrade definition to a software model specification for the software package, wherein the software model specification includes a publisher of the software package, an application title of the software package, and the version of the software package; obtaining one or more entitlements for the software package; based on the software downgrade definition being associated with the software model specification, associating the software downgrade definition with the one or more entitlements; and calculating compliance of the installations of the software package in the managed network with the one or more entitlements, wherein the software downgrade definition causes each of the one or more entitlements to be applicable to the installations of the version of the software package or the one or more earlier versions of the software package.

In a second example embodiment, a method, such as a computer-implemented method, may involve some or all the operations of the first example embodiment.

In a third example embodiment, an article of manufacture may include a non-transitory computer-readable medium, having stored thereon program instructions that, upon execution by a computing system, cause the computing system to perform operations in accordance with the first example embodiment.

In a fourth example embodiment, a system may include various means for persistent storage and means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7A shows a user interface for software model specifications, in accordance with example embodiments.

FIG. 7B shows a user interface for entitlements, in accordance with example embodiments.

DETAILED DESCRIPTION

Figure 1:
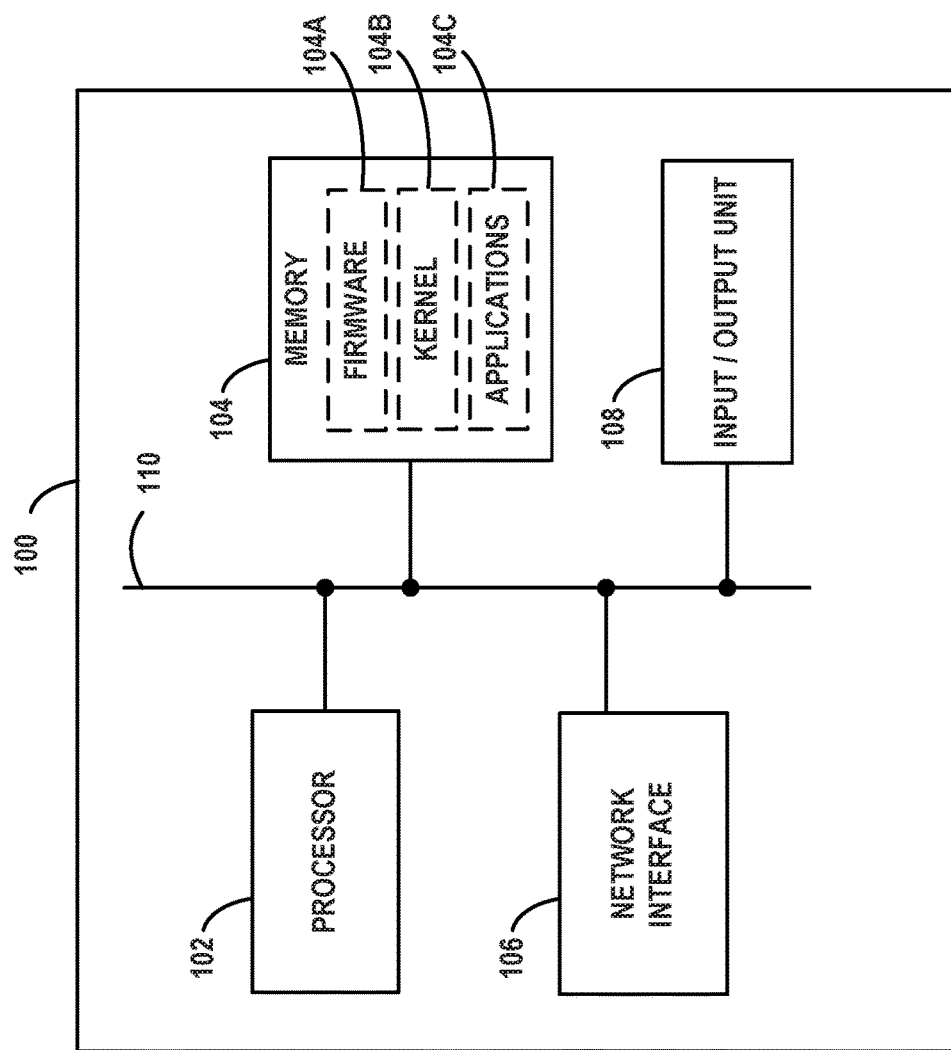
FIG. 1 illustrates a schematic drawing of a computing device, in accordance with example embodiments.

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software packages, such as customer relationship management (CRM) and human capital management (HCM) packages. However, they may also need custom software packages to meet their own unique requirements. A large enterprise often has dozens or hundreds of these custom software packages. Nonetheless, the advantages provided by the embodiments herein are not limited to large enterprises and may be applicable to an enterprise, or any other type of organization, of any size.

Many such software packages are developed by individual departments within the enterprise. These range from simple spreadsheets to custom-built software tools and databases. But the proliferation of siloed custom software packages has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wi-Fi™), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wi-Fi™ interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
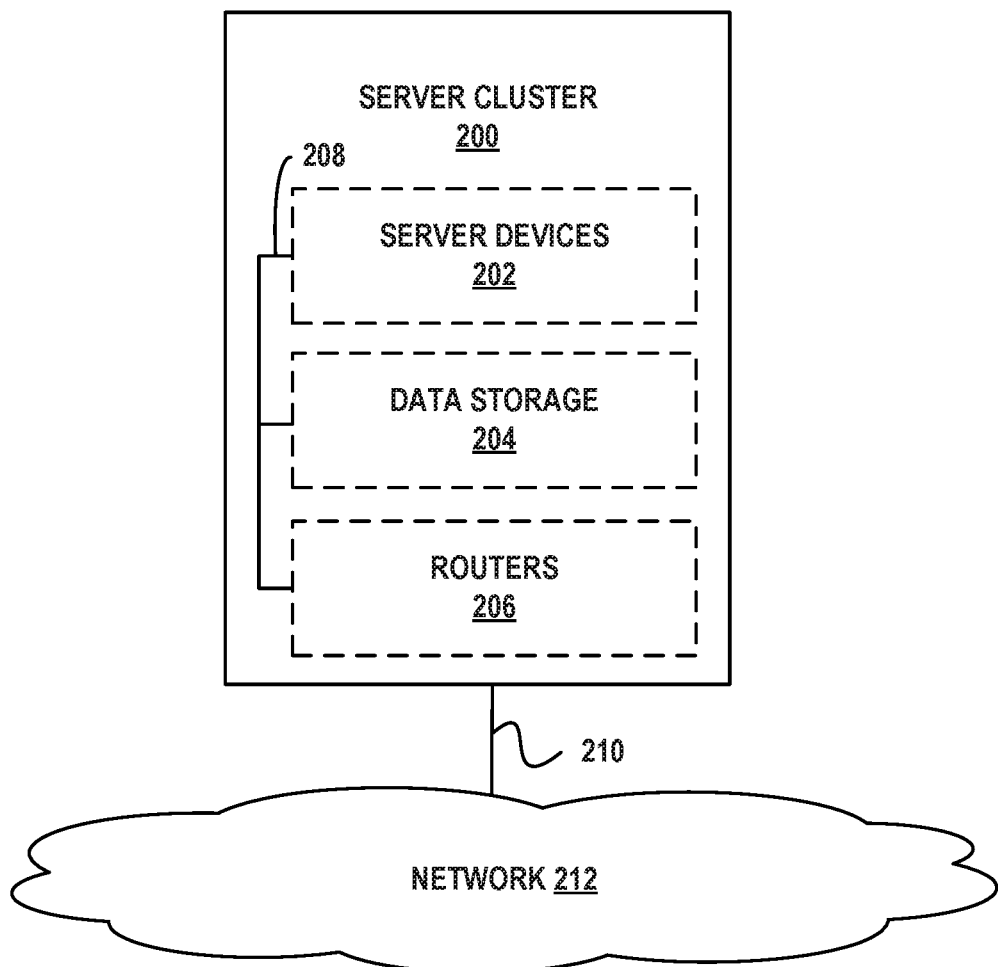
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
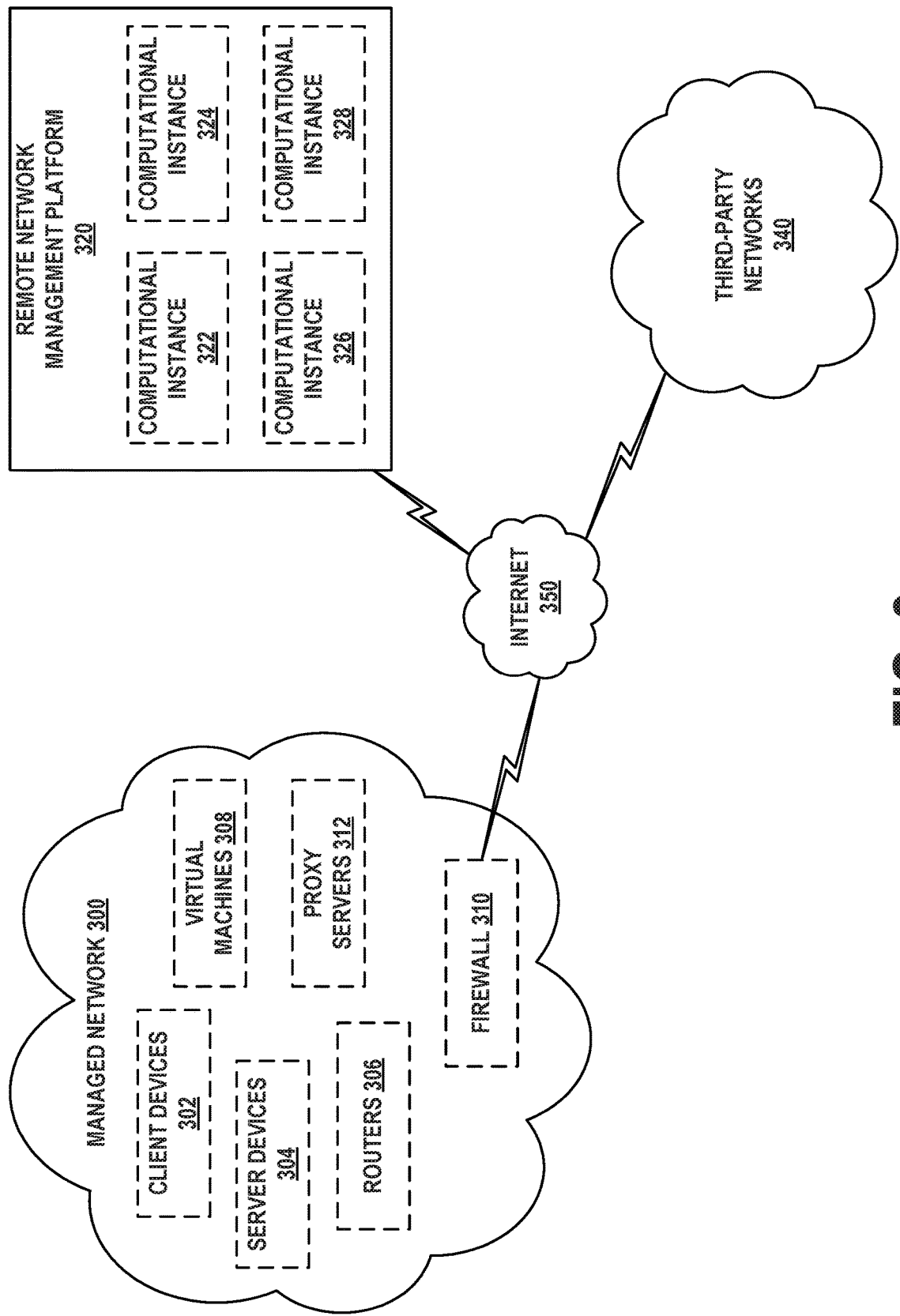
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
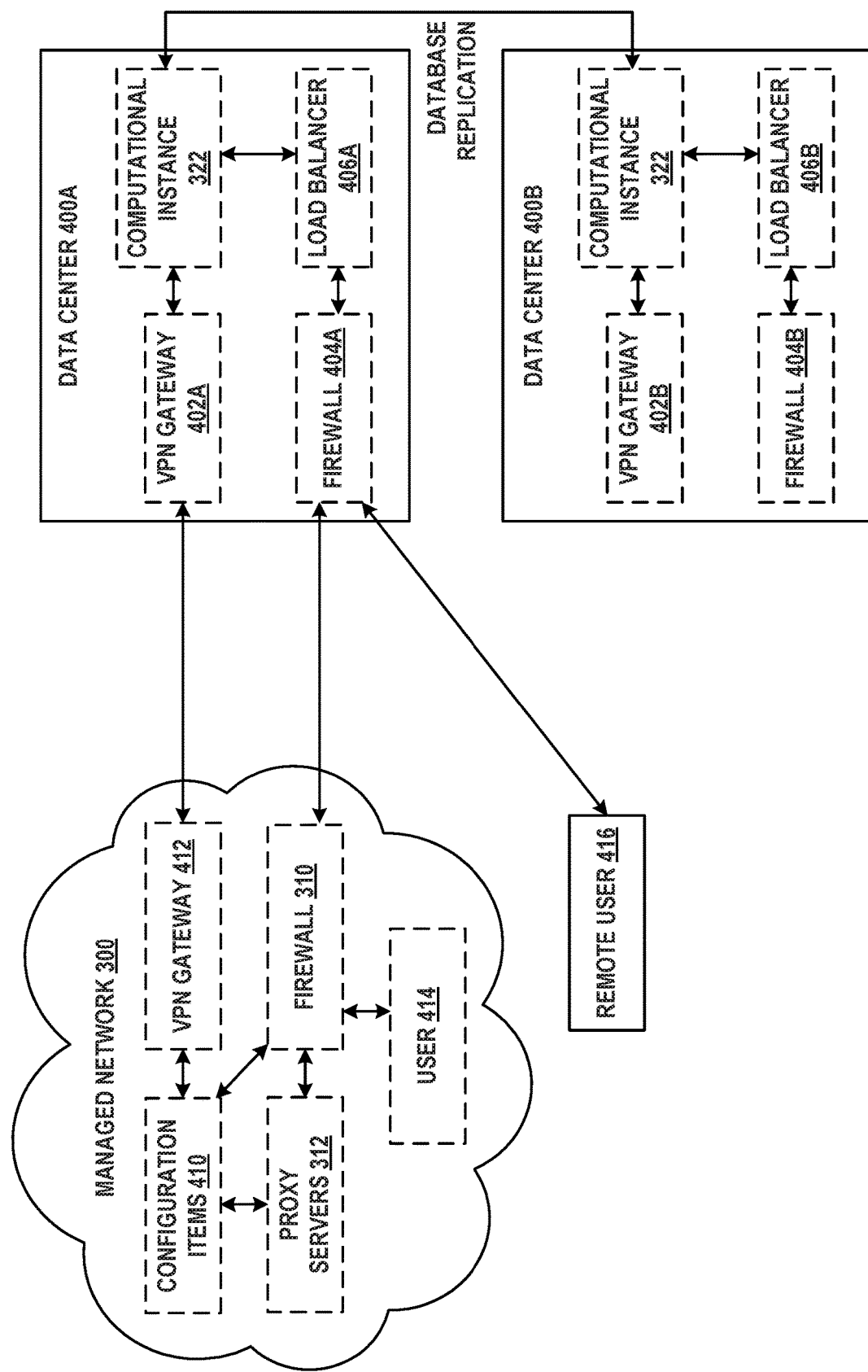
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
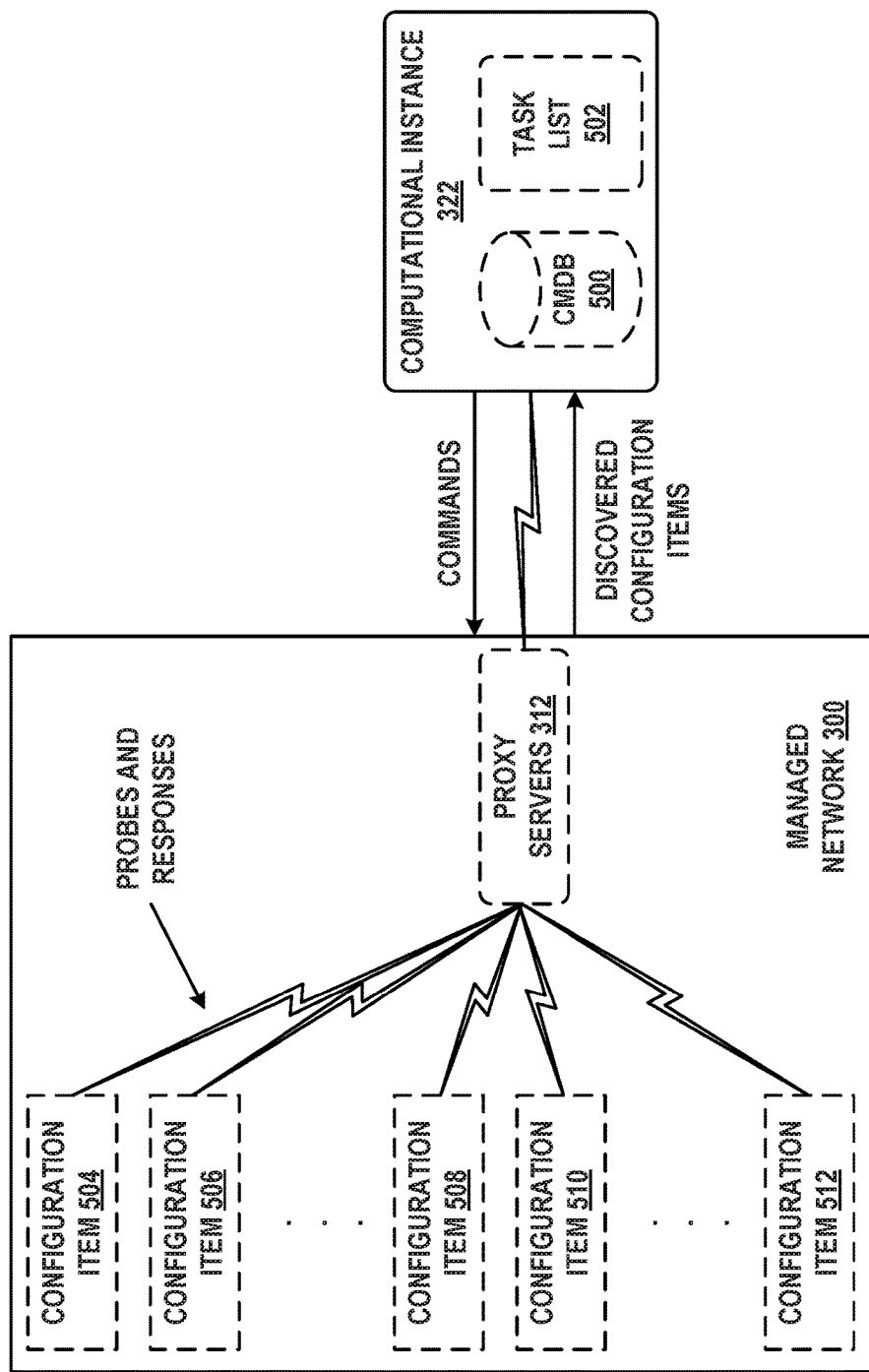
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
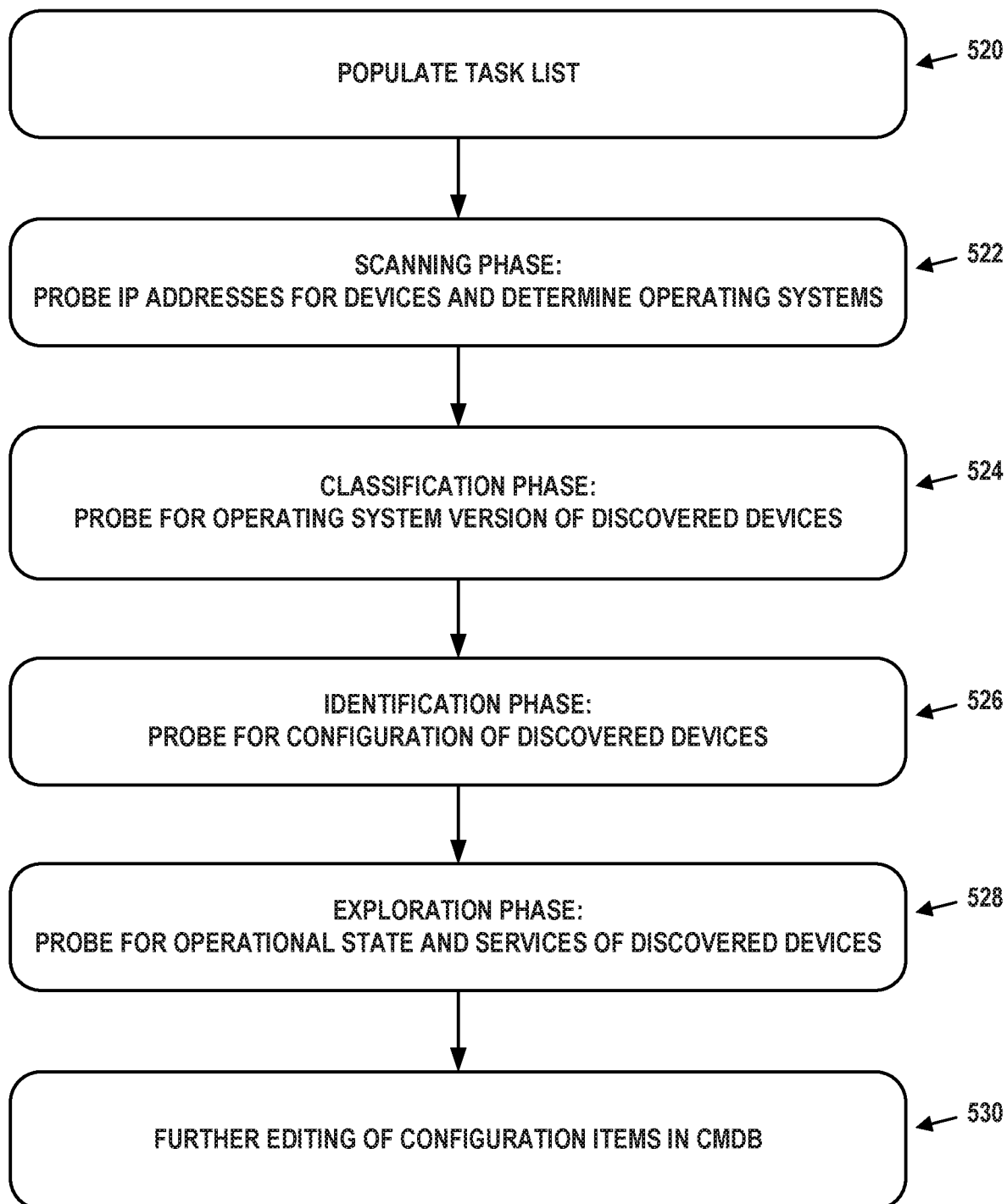
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CALCULATING SOFTWARE LICENSE COMPLIANCE USING SOFTWARE DOWNGRADE DEFINITIONS

Some software packages used by managed network 300 may be installed on the individual computing, client, and/or server devices disposed on managed network 300. Such software is often proprietary, and may be licensed in various ways. For example, managed network 300 may utilize a number of different licensed software packages, each licensed software package associated with one or more software licenses specifying permitted usage of the licensed software package. In order for one of these devices to use a licensed software package, a network administrator may allocate part or all of a software license to a corresponding installed instance of the licensed software package Regardless of the licensing scheme, a licensee may attempt to keep track of which of its computing, client, and/or server devices use what licensed software; e.g., to verify and/or calculate compliance with software licenses associated with the licensed software. Managing licenses for software packages installed in managed network 300 may involve more than just tracking usage of software packages. Rather, managing these licenses may involve understanding hierarchical relationships between various versions of software packages To track software licenses, the licensee may attempt to maintain entitlement records, or "entitlements" for short. An entitlement can represent a software license for a software package held by managed network 300 and can include information about software license rights (e.g., downgrade rights and/or upgrade rights) for the software license. For example, the entitlement can include license metric data specifying metrics and counts associated for the software license and license duration data specifying how long a software license lasts. The entitlement can refer to or be attached to a software model specification; e.g., to specify the software being licensed and related software downgrade (and perhaps upgrade) definitions.

A software model specification can include information about a software package being licensed. For example, the software model specification can include information about a publisher (or vendor), an application title (e.g., a software package name), a version, and one or more software downgrade definitions. The one or more software downgrade definitions can specify a hierarchy of downgrade rights for the version.

A software downgrade definition can include information about relationships between one or more versions of a software package. Each version of the software package can be specified using a discovery map that includes application title and specific version information. Downgrade (and perhaps upgrade) rights for the software package can be specified based on relationships, between discovery maps of the software downgrade definition. For example, a first discovery map for a version VER_2 for an application title SW_TITLE1 that refers to a second discovery map for a version VER_1 for application title SW_TITLE1 can represent a downgrade right for the software title SW_TITLE1 from version VER_2 to version VER_1. A software downgrade definition can record these relationships between discovery maps as a hierarchy (or other organization) of software rights for a software package with the application title.

Relationships between discovery maps for a software downgrade definition can be determined based on a search for these relationships between discovery maps. For example, a software downgrade definition can be initially associated with a first or "root" discovery map representing a specific version of a software title/software package. The search can start with the root discovery map to find "leaf" discovery maps referred to by the root discovery map. If any leaf discovery maps are found, the software downgrade definition can be updated to associate with the leaf discovery maps in accordance with the references between the root discovery map and the leaf discovery maps. Also, the leaf discovery maps can be added to a list of discovery maps. Then, the search can continue by removing a discovery map from the list of discovery maps, and performing the search for leaf discovery maps of the removed discovery maps, adding any leaf discovery maps to the software downgrade definition and the list of discovery maps, and so on, until the list of discovery maps is empty and the search can be completed.

Entitlements representing software licenses for the various versions of a software package can be used to calculate compliance of installations of the software package in the managed network, where the software downgrade definitions of the entitlements are used to select entitlements that are applicable to the installations of the various versions of the software package. In cases where the compliance calculation indicates that the entitlements for managed network 300 represent software licenses that cover all licensed software installed (or otherwise used) in managed network 300, the compliance calculation can generate an output reporting that managed network 300 is in compliance with its software licenses. In other cases where the compliance calculation indicates that the entitlements for managed network 300 represent software licenses that do not cover all licensed software installed (or otherwise used) in managed network 300 the compliance calculation can generate an output indicating at least one software license for at least one installed version of at least one software package is not available for managed network 300. For example, the output can identify which software titles and versions are installed in managed network 300 but do not have corresponding software licenses.

The compliance calculation may include: selecting a first computing device of managed network 300, wherein the first computing device has an installation of a software package; determining an installed version of the software package on the first computing device; selecting a group of associated entitlements of the one or more entitlements for the software package, wherein each associated entitlement of the group of associated entitlements is associated with the installed version of the software package; and selecting a closest-match entitlement of the group of associated entitlements based on software downgrade definitions of the group of associated entitlements. The closest-match entitlement can be associated with the installed version of the software package and is associated with a smallest number of software downgrade definitions of the group of associated entitlements. That is, the closest-match entitlement is the entitlement that matches the installed version of the software package and the smallest number of other versions of the software package. Then, a determination may be made whether a software license for the installed version of the software package is available based on the closest-match entitlement.

A closest match entitlement can be an entitlement whose software downgrade definition exactly matches an installed version and any related downgrades of the particular software package currently installed on a device. If the closest match entitlement has license metric data that indicates a software license is available for the installed version of the particular software package; it can be determined that the software license associated with the closest-match entitlement is available for allocation to the installed version of the software package. Then, license metric data for the closest-match entitlement can be updated to indicate that the software license associated with the closest-match entitlement has been allocated to the installed version. For example, suppose that the license metric data for the closest-match entitlement indicates a number of available rights NAR for the installed version of the software package; e.g., a number of installations, a number of users, or a number of devices. If NAR is greater than zero, then the software license associated with the closest-match entitlement can be allocated to the installed version, and NAR can be decremented by one, representing allocation of one right. In a related example, suppose that a computing device has four cores, and NAR represents a number of cores where the software package is installed. Then, in this example, if NAR is greater than four (the number of cores), then the software license associated with the closest-match entitlement can be allocated to the installed version, and NAR can be decremented by four.

However, if the closest match entitlement does not have license metric data that indicates a software license is available for the installed version of the particular software package; e.g., license metric data that includes, is but not limited to, a number of available rights for the installed version of the particular software package that is zero (or less), then an attempt to select a different entitlement than the closest-match entitlement can be performed. For example, the different entitlement can be a minimum entitlement that is associated with a minimum number of software downgrade definitions of the group of associated entitlements and has license metric data that indicates that a software license associated with the minimum entitlement is available for the installed version. If such a minimum entitlement is found, then the software license associated with the minimum entitlement can be allocated to the installed version and license metric data for the minimum entitlement can be updated to indicate that this software license has been allocated to the installed version The compliance calculation can first use entitlements that are associated with a software version that exactly matches an installed software version. Similarly, entitlements associated with a fewer number of software downgrade definitions, and therefore a fewer number of software versions, can be used before entitlements with a larger number of software downgrade definitions, and therefore a larger number of software versions by the compliance calculation.

By using exactly matching entitlements first, and then using entitlements associated with a fewer number of software versions allows the compliance calculation to maintain flexibility in assigning software licenses to installed software versions. An exactly matching entitlement can only be used for installations of the installed software version, and so is less flexible than entitlements associated with more software versions. Further, entitlements associated with a fewer number of software versions are less flexible than software licenses associated with entitlements associated with a larger number of software versions Thus, the compliance calculation can attempt to maintain license flexibility by using less flexible licenses (as represented by entitlements) before using more flexible licenses.

As an example of a compliance calculation, a computing device CD1 of managed network 300 may be selected, where CD1 has version SPV2.1 of software package SP1 installed without ever having been downgraded. Then, to determine whether managed network has a software license available for CD1, a search of entitlements can be made to find a group of entitlements that is associated with version SPV2.1. In this example, the group of entitlements associated with version SPV2.1 can include an entitlement EN1 that has software downgrade definitions for versions SP1V1, SP1V2, SP3V2.1, SP3V2.2, SP3V3, and SP3V3.1 of software package SP1; entitlement EN2 for versions SP1V1, SP1V2, SP3V2.1, and SP3V2.2 of software package SP1; and entitlement EN3 for version SPV2.1 of software package SP1. In this example, entitlement EN3 has one software downgrade definition for version SPV2.1 that exactly matches the installed version SPV2.1 of software package SP1 installed on CD1. Also, license metric data of entitlement EN3 indicates that a software license associated with EN3 is available for installed version SPV2 of software package SP1 installed on CD1. Then, the license metric data of entitlement EN3 may be updated to reflect that the software license associated with entitlement EN3 has been used for installed version SPV2.1 of software package SP1 installed on CD1; e.g., a number of installations or available rights of entitlement EN3 can be decremented. The compliance calculation can continue for all software packages of CD1, and further continue for some or all devices having software packages in managed network 300.

In a related example, if the license metric data of entitlement EN3 indicated that the software license associated with entitlement EN3 could not be used for installed version SPV2.1, another entitlement of the group of entitlements other than EN3 can be selected; e.g., either EN1 or EN2. Of EN1 or EN2, the compliance calculation may attempt to use entitlement EN2 as a minimum entitlement before attempting to use entitlement EN1. Entitlement EN2 can be the minimum entitlement, as entitlement EN2 has four software downgrade definitions (for versions SP1V1, SP1V2, SP3V2.1, and SP3V2.2), which is smaller than the six software downgrade definitions associated with entitlement EN1 (for versions SP1V1, SP1V2, SP3V2.1, SP3V2.2, SP3V3, and SP3V3.1).

In this example, entitlement EN2 has software downgrade definitions for installed version SPV2.1 that are the minimum number of software downgrade definitions/software versions of any entitlement remaining in the group of entitlements and license metric data of entitlement EN2 indicates that a software license associated with entitlement EN2 can be used for installed version SPV2.1. Then, the license metric data of entitlement EN2 may be updated to reflect that the software license associated with entitlement EN2 has been used for installed version SPV2.1; e.g., a number of installations or available rights of entitlement EN2 can be decremented.

In another related example, suppose that all of entitlements EN1, EN2, and EN3 have license metric data that indicates no software licenses are available for a current number of installations of version SPV2.1 of software package SP1 in managed network 300 found during the compliance calculation. Then, the compliance calculation may indicate that additional software licenses may be necessary to maintain compliance with software licenses for software package SP, as there is a deficiency in software licenses for version SPV2.1 of software package SP1 based on the current number of installations of version SPV2.1 in managed network 300. A deficiency of software licenses can occur when more installations of a particular software package are found installed (e.g., installed in managed network 300) than are licensed and/or occurs when more installations of a particular version of a particular software package are found installed than are licensed.

Output from the compliance calculation may include, but is not limited to, a total number of installations of licensed software found in managed network 300, a number of installations found for one or more licensed software packages in managed network 300, a number of installations found for one or more versions of one or more licensed software packages in managed network 300, a number of licenses used for licensed software found in managed network 300, a number of licenses used for one or more licensed software packages installed in managed network 300, a number of licenses used for one or more versions of one or more licensed software packages installed in managed network 300.

As indicated above, the compliance calculation may determine one or more deficiencies of software licenses according to license metric data of the entitlements associated with managed network 300. Such deficiencies of software licenses, if present for managed network 300, may be output: as found during the compliance calculation, as a total number of deficiencies of software licenses found in managed network 300, as a number of deficiencies of software licenses found for one or more licensed software packages in managed network 300, and/or as a number of deficiencies of software licenses found for one or more versions of one or more licensed software packages in managed network 300. Other outputs of the compliance calculation are possible as well; e.g., reports on a per-vendor basis.

As will be discussed in more detail below, the embodiments described herein provide a technical improvement over previous approaches for software asset management, particularly with respect to assigning software downgrade definitions to the entitlements of licensed software in the most efficient manner, depending on the license.

For example, existing techniques for generating software downgrade definitions may involve modifying each individual entitlement of a particular licensed software package and manually generating software downgrade definitions provided by the license. By contrast, improved approaches described herein dynamically identify the lowest-level entitlement required by a software model specification and whether there exists an available entitlement under the currently implemented license, thereby saving user effort to generate and maintain software downgrade definitions. In addition, the improved approaches described herein enable modification of entitlements to align entitlements with software licenses.

VI. DETERMINING ALLOCATION OF DOWNGRADE RIGHTS USING ENTITLEMENTS

Figure 6A:
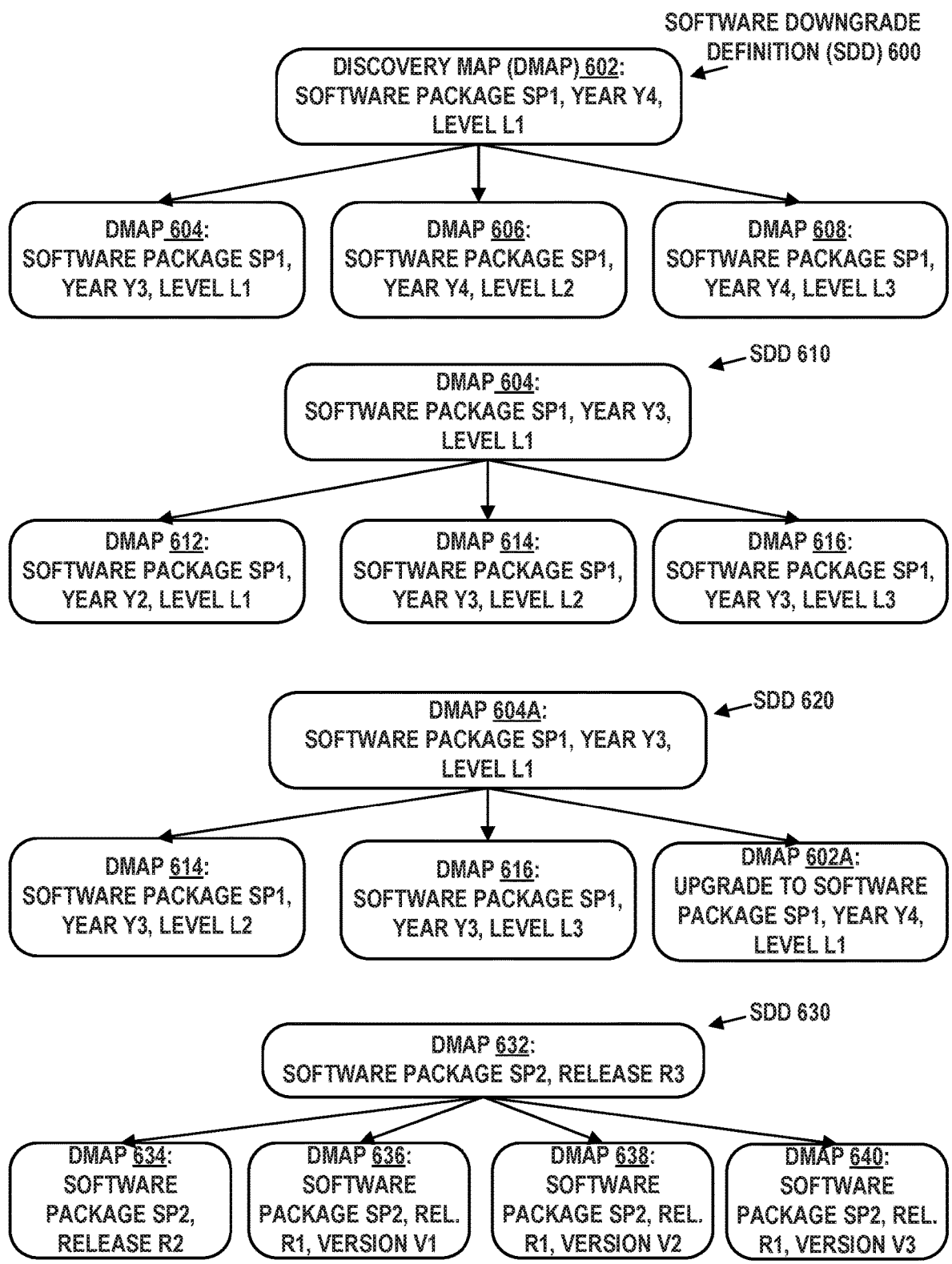
FIG. 6A shows several software downgrade definitions associated with software licenses, in accordance with example embodiments.

FIG. 6A shows software downgrade definitions (SDDs) 600, 610, 620, 630 associated with software licenses, in accordance with example embodiments. Software downgrade definition 600 includes discovery maps (DMAPs) 602, 604, 606, and 608; software downgrade definition 610 includes discovery maps 604, 612, 614, and 616, software downgrade definition 620 includes discovery maps 604A, 614, 616, and 602A; and software downgrade definition 630 includes discovery maps 632, 634, 636, 638, and 640. A discovery map can represent a particular version of a software package; e.g., discovery map 602 represents a version of a software package (or title) "SP1", where the version is specified as a year "Y4" and a level "L1". Herein, the year and level of a software package may collectively represent its version. But other ways of specifying a version of a software package are possible.

A software downgrade definition may have a tree structure with a root discovery map and zero or more leaf discovery maps; where a leaf discovery map of a software downgrade definition specifies a downgrade definition or, in some cases, an upgrade definition of a version of a software package specified by the root discovery map. A relationship from the root discovery map to a lower discovery map (e.g., a leaf discovery map) can indicate a downgrade definition; e.g., the relationship from root discovery map 602 of software downgrade definition 600 to leaf discovery map 604 indicates that a version of year "Y4" and a level "L1" of software package "SP1" can be downgraded to a version of year "Y3" and a level "L1" of software package "SP1". In some examples, a relationship from the root discovery map to a lower discovery map can indicate a upgrade definition; e.g., the relationship from root discovery map 604A of software downgrade definition 620 to leaf discovery map 602A indicates that a version of year "Y3" and a level "L1" of software package "SP1" can be upgraded to a version of year "Y4" and a level "L1" of software package "SP1". Other examples of downgrade and upgrade definitions are possible as well.

The terms "tree structure", "root", and "leaf" are not intended to indicate use of a specific data structure to represent software downgrade definitions and discovery maps; that is, while trees and related data structures can represent discovery maps and software downgrade definitions, other data structures can be used as well; e.g., a root discovery map can be a key for a database, lookup table, or key-value structure that can be queried to provide leaf discovery maps associated with the root discovery map as a key.

Software downgrade definition 600 specifies relationships of its root discovery map 602. In particular, discovery map 602 specifies a software package "SP1" and a version of the software package issued in year "Y4" and having level "L1". Discovery map 602 is also shown being associated with each of discovery maps 604, 606, 608, where discovery maps 604, 606, 608 represent downgrade definitions from the version of the software package specified by discovery map 602. Discovery map 604 specifies a software package "SP1" and a version of the software package issued in year "Y3" and having level "L1", discovery map 606 specifies a software package "SP1" and a version of the software package issued in year "Y4" and having level "L2", and discovery map 608 specifies a software package "SP1" and a version of the software package issued in year "Y4" and having level "L3".

Software downgrade definition 600 indicates that a version of software package SP1 issued in year Y4 and having level L1 (specified by root discovery map 602) has three downgrade definitions: a downgrade definition to a version of software package SP1 issued in year Y3 and having level L1 (specified by leaf discovery map 604), a downgrade definition to a version of software package SP1 issued in year Y4 and having level L2 (specified by leaf discovery map 606), and a downgrade definition to a version of software package SP1 issued in year Y4 and having level L3 (specified by leaf discovery map 608).

Software downgrade definition 610 specifies relationships of its root discovery map 604. In particular, discovery map 604 specifies a software package "SP1" and a version of the software package issued in year "Y3" and having level "L1". Discovery map 604 is also shown being associated with each of discovery maps 612, 614, 616, where discovery maps 612, 614, 616 represent downgrade definitions from the version of the software package specified by discovery map 604. Discovery map 612 specifies a software package "SP1" and a version of the software package issued in year "Y2" and having level "L1", discovery map 614 specifies a software package "SP1" and a version of the software package issued in year "Y3" and having level "L2", and discovery map 616 specifies a software package "SP1" and a version of the software package issued in year "Y3" and having level "L3".

Software downgrade definition 610 indicates that a version of software package SP1 issued in year Y3 and having level L1 (specified by root discovery map 604) has three downgrade definitions: a downgrade definition to a version of software package SP1 issued in year Y2 and having level L1 (specified by leaf discovery map 612), a downgrade definition to a version of software package SP1 issued in year Y3 and having level L2 (specified by leaf discovery map 614), and a downgrade definition to a version of software package SP1 issued in year Y3 and having level L3 (specified by leaf discovery map 616).

Software downgrade definition 620 specifies relationships of its root discovery map 604A. In particular, discovery map 604A specifies a software package "SP1" and a version of the software package issued in year "Y3" and having level "L1". Discovery map 604A is also shown being associated with each of discovery maps 614, 616, 602A, where discovery maps 614, 616, 602A represent upgrade and downgrade definitions from the version of the software package specified by discovery map 604A. Discovery map 614 specifies a software package "SP1" and a version of the software package issued in year "Y3" and having level "L2", discovery map 616 specifies a software package "SP1" and a version of the software package issued in year "Y3" and having level "L3", and discovery map 602A specifies a software package "SP1" and a version of the software package issued in year "Y4" and having level "L1".

Software downgrade definition 620 indicates that a version of software package SP1 issued in year Y3 and having level L1 (specified by root discovery map 604A) has two downgrade definitions and one upgrade definition: a downgrade definition to a version of software package SP1 issued in year Y3 and having level L2 (specified by leaf discovery map 614), a downgrade definition to a version of software package SP1 issued in year Y3 and having level L3 (specified by leaf discovery map 616), and an upgrade definition to a version of software package SP1 issued in year Y4 and having level L1 (specified by leaf discovery map 602A).

Different software downgrade definition can specify relationships between different software packages, perhaps using different indicia of different versions. Software downgrade definition 630 specifies relationships of its root discovery map 632. In particular, discovery map 632 specifies a software package "SP2" and a version of the software package issued as release "R3". As such, software downgrade definition 630 specifies relationships of a different software package—SP2—than software package SP1 referred to by software downgrade definitions 600, 610, 620.

Discovery map 632 is also shown being associated with each of discovery maps 634, 636, 638, 640, where discovery maps 634, 636, 638, 640 represent downgrade definitions from the version of the software package specified by discovery map 632. Discovery map 634 specifies a software package "SP2" and a version of the software package issued as release "R2", discovery map 636 specifies a software package "SP2" and a version of the software package issued as release "R2" and version "V1", discovery map 638 specifies a software package "SP2" and a version of the software package issued as release "R2" and version "V2", and discovery map 640 specifies a software package "SP2" and a version of the software package issued as release "R1" and version "V3". As indicated above, a version of software package SP1 is specified using indicia related to a year and a level; e.g., year Y4. In contrast, a version of software package SP2 is specified using indicia related to a release and version. Other indicia for specifying a software version are possible as well.

Software downgrade definition 630 indicates that a version of software package SP2 issued as release R3 (specified by root discovery map 632) has four downgrade definitions: a downgrade definition to a version of software package SP2 issued as release R2 (specified by leaf discovery map 634), a downgrade definition to a version of software package SP2 issued as release R1 and version V1 (specified by leaf discovery map 636), a downgrade definition to a version of software package SP2 issued as release R1 and version V2 (specified by leaf discovery map 638), and a downgrade definition to a software package SP2 issued as release R1 and version V3 (specified by leaf discovery map 640).

In the example shown in FIG. 6A, each software downgrade definition 600, 610, 620, 630 has only root and leaf discovery maps. Using only root and leaf discovery maps for some software downgrade definitions allows for relatively simple specification, perhaps by data entry, of these software downgrade definitions. However, software licenses for a particular software package may relate to each other. For example, a software license represented by software downgrade definition 600 relates to a software license represented by software downgrade definition 610. In particular, a relationship is indicated by root discovery map 604 of software downgrade definition 610 also being a leaf discovery map of software downgrade definition 600.

In software licensing terms, software downgrade definition 600 can represent a license of software package SP1 issued in year Y4 and having level L1 having downgrade definitions that include a downgrade to software package SP1 issued in year Y3 and having level L1, and software downgrade definition 610 can represent a license of software package SP1 issued in year Y3 and having level L1. Then, by linking software downgrade definitions 600 and 610, the owner of license of software package SP1 issued in year Y4 and having level L1 can have downgrade definitions for that license as well also have downgrade definitions (via the license software package SP1 issued in year Y3 and having level L1) to software package SP1 issued in year Y2 and having level L1, software package SP1 issued in year Y3 and having level L2, and software package SP1 issued in year Y3 and having level L3; that is, an installation of software package SP1 issued in year Y4 and having level L1 can be downgraded to, for example, software package SP1 issued in year Y3 and having level L2 under these two licenses.

A search technique for searching discovery maps and software downgrade definitions can be used to find such relationships between software downgrade definitions. For example, suppose a search of software downgrade definitions was initiated to find discovery maps related to a search-start discovery map; for example, discovery map 602. The search-start discovery map can be specified using a search-start software downgrade definition; then, the search-start discovery map can be determined to be the root discovery map (or perhaps another discovery map) of the search-start software downgrade definition.

In an example, suppose the search technique is to search for relationships between software downgrade definitions depicted in FIG. 6A starting with search-start discovery map 602. The search technique could attempt to find one or more software downgrade definitions whose root discovery maps specify the same software version as search-start discovery map 602. The search technique could find software downgrade definition 600, indicating that discovery map 602 is associated with discovery maps 604, 606, and 608. Then, the search technique could proceed with leaf discovery maps of software downgrade definition 600. That is, the search technique could attempt to find one or more software downgrade definition whose root discovery maps specify the same software package and version as leaf discovery maps of software downgrade definition 600. A search based on discovery map 604 could find software downgrade definition 610, indicating that software downgrade definition 600 and discovery map 602 are also associated with discovery maps 612, 614, and 616 through software downgrade definition 610 and discovery map 604. The search technique could also attempt to find one or more software downgrade definitions whose root discovery maps specify the same software package and version as discovery maps 606, 608 (and subsequently discovery maps 612, 614, and 616) but fail to find such software downgrade definitions.

Then, the search technique could conclude with a result that software downgrade definition 600 and discovery map 602 are associated with discovery maps 604, 606, and 608 directly, and are associated with discovery maps 612, 614, and 616 through software downgrade definition 610 and discovery map 604. The search technique could generate a software downgrade definition SDD1 with a root discovery map 602, an intermediate discovery map 604, and leaf discovery maps 606, 608, 612, 614, and 616; where the intermediate discovery map is a leaf discovery map in one software downgrade definition (software downgrade definition 600) and a root discovery map in another software downgrade definition (software downgrade definition 610), and so can link software downgrade definitions to make software downgrade definition SDD1.

A software model specification may include or refer to a software downgrade definition; e.g., to record results of the above-mentioned search technique. Then, an entitlement representing a software license can refer to and/or be initialized using a software model specification that specifies relationships between software licenses as modeled by a software downgrade definition of the software model specification An entitlement may be modified by selecting particular downgrade definitions for addition and/or removal based on terms of a specific license. For example, suppose that a standard license for software package SW123 version V123 includes downgrade definitions for the previous three versions V120, V121, and V122, and that software model specification SMS123 models the standard license for software package SW123 version V123. Then, a non-standard software license for software package SW123 version V123 is obtained with downgrade definitions for only the previous two versions V121 and V122. Then, an entitlement E123 to represent the non-standard software license for software package SW123 by (1) initializing entitlement E123 with the relationships of software model specification SMS123 and (2) modifying entitlement E123 by selecting downgrade definitions for version V120 for removal from E123. Other examples as possible as well.

Figure 6B:
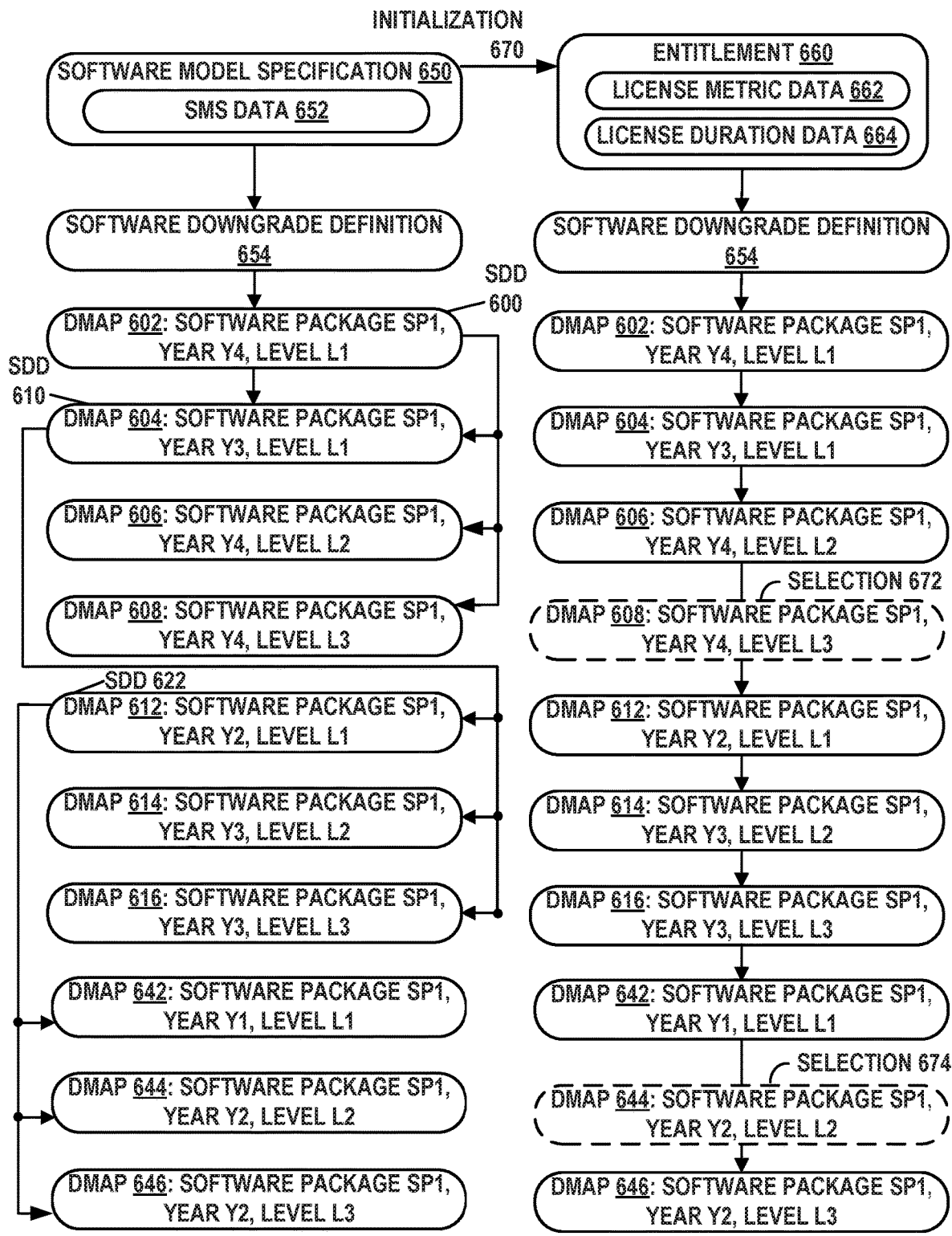
FIG. 6B shows a software model specification related to the software downgrade definitions of FIG. 6A and an entitlement associated with the software model specification, in accordance with example embodiments.

FIG. 6B shows software model specification 650 related to the software downgrade definitions shown in FIG. 6A and entitlement 660 related to software model specification 650, in accordance with example embodiments. Software model specification 650 may be predefined in a remote network management platform or manually entered by a user. Software downgrade definitions 600, 610 may be a result of searching software downgrade definitions for downgrade definitions related to the software package represented by software downgrade definition 600 and/or discovery map 602 based on the above-mentioned search technique.

FIG. 6B shows that software model specification (SMS) 650 includes software model specification data 652 and a reference to software downgrade definition 654. Software model specification data 652 can include a name or identifier for software model specification 650 and data about a software title/software package modeled by software model specification 650, including but not limited to, a publisher name or identifier, an application title, package name or identifier, and/or version information.

Software downgrade definition 654 can represent possible downgrades and upgrades from a version of a software package (or software title) represented by software model specification data 652. In the example shown in FIG. 6B, software downgrade definition 654 includes references to: (i) software downgrade definition 600 with root discovery map 602, intermediate discovery map 604, and leaf discovery maps 606 and 608; (ii) software downgrade definition 610 with root discovery map 604, intermediate discovery map 612, and leaf discovery maps 614 and 616; and (ii) software downgrade definition 622 with root discovery map 612 and leaf discovery maps 642, 644, and 646.

Intermediate discovery map 604 relates a version of software package SP1 issued in year Y3 and having level L1 as a downgrade to a version of software package SP1 issued in year Y4 and having level L1 (represented using discovery map 602). By being the root discovery map of software downgrade definition 610, intermediate discovery map 604 also relates the version of software package SP1 issued in year Y3 and having level L1 to downgrade definitions specified by discovery maps 612, 614, and 616.

Intermediate discovery map 612 relates a version of software package SP1 issued in year Y2 and having level L1 as a downgrade definition to a version of software package SP1 issued in year Y3 and having level L1 (represented using discovery map 604). By being the root discovery map of software downgrade definition 622, intermediate discovery map 612 also relates the version of software package SP1 issued in year Y2 and having level L1 to downgrade definitions specified by discovery maps 642, 644, and 646.

Entitlement 660 can be associated with software model specification 650. For example, initialization operation 670 can link, copy, and/or otherwise reference entitlement 660 with software model specification 650 and/or software downgrade definition 654. After initialization operation 670, entitlement 660 is associated, via software downgrade definition 654, with the same software downgrade definition as software model specification 650. As such, entitlement 660 is initially associated with all software downgrade (and in some cases, upgrade) definitions associated with software model specification 650.

In some examples, initialization operation 670 can include specifying license metric data 662 and/or license duration data 664 of entitlement 660. License metric data 662 of entitlement 660 can include data about whether a software license represented by entitlement 660 is licensed for an entire entity, per site/location of the entity, per computing device of the entity, per processor of the entity, per processor core of the entity, per user of the entity, etc. License metric data 662 can also include a number of sites, locations, computing devices, processor, cores, users, etc. allowed to use the software license. For example, suppose that organization ABCDE Org. had two software licenses—a first software license for a software package that was licensed for use throughout ABCDE Org., and a second software license for a software package that was licensed for use to be installed on 100 processor cores throughout ABCDE Org. Then, license metric data 662 of an entitlement representing the first software license could indicate that the first software license is licensed for the entire entity. And, license metric data 662 of an entitlement representing the second software license could indicate that the second software license is licensed on a per processor core basis for 100 processor cores.

License duration data 664 can indicate how long a software license lasts; e.g., the duration of the software license. That is, license duration data 664 can indicate: that a software license is perpetual (that is, the software license does not expire/has an infinite duration), an expiration date for the software license, and/or a number of time units (e.g., days, weeks, months, years) that the software license lasts. Other examples of license metric data 662 and license duration data 664 are possible as well.

Entitlement 660 can be updated using one or more selection operations to add, remove, and/or update one or more associated software versions, software downgrade definitions and/or software upgrade definitions that make up related software downgrade definition 654. FIG. 6B shows that selection operation 672 removes a software version associated with discovery map 608 from software downgrade definition 654, and therefore from entitlement 660, that permits downgrading software package SP1 to a version issued in year Y4 and having level L3. For example, selection operation 672 can be performed on software downgrade definition 654 if a software license represented by entitlement 660 does not support a downgrade of software package SP1 to a version issued in year Y4 and having level L3.

FIG. 6A shows that selection operation 674 removes a software version associated with discovery map 644 from software downgrade definition 654, and therefore from entitlement 660, that permits downgrading software package SP1 to a version issued in year Y2 and having level L2. For example, selection operation 674 can be performed on software downgrade definition 654 if a software license represented by entitlement 660 does not support a downgrade of software package SP1 to a version issued in year Y2 and having level L2. Both discovery maps 608 and 644 for entitlement 660 are shown using dashed lines to indicate that discovery maps 608 and 644 have been removed from software downgrade definition 654 after initialization of entitlement 660.

Figure 6C:
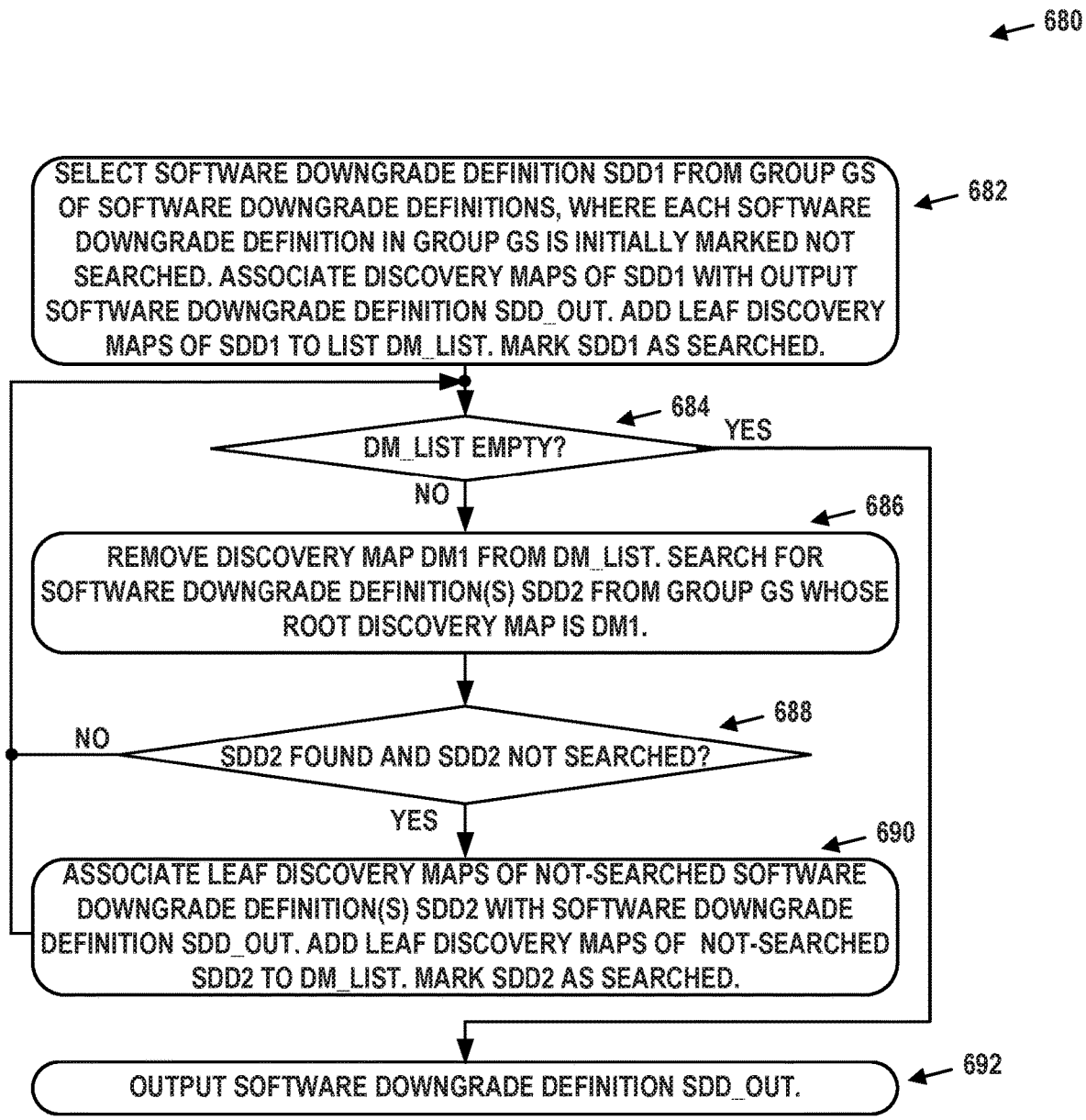
FIG. 6C is a flow chart, in accordance with example embodiments.

FIG. 6C is a flow chart 680, in accordance with example embodiments. Flow chart 680 relates to a search technique for searching discovery maps to find such relationships between software downgrade definitions. The search technique illustrated by flow chart 680 may be carried out by a computing device, such as computing device 100, and/or a cluster of computing devices, such as server cluster 200. However, the search technique can be carried out by other types of devices or device subsystems. For example, the search technique could be carried out by a portable computer, such as a laptop or a tablet device. The embodiments of FIG. 6C may be simplified by the removal of any one or more of the features shown therein. Further, these embodiments may be combined with features, aspects, and/or implementations of any of the previous figures or otherwise described herein.

The search technique illustrated by flow chart 680 can begin at block 682. Block 682 involves selecting a software downgrade definition SDD1 from a group of software downgrade definitions GS, such as a group of software downgrade definitions shown in FIG. 6A. At block 682, each software downgrade definition of the group GS, including software downgrade definition SDD1, is initially marked as not searched. Block 682 further involves associating discovery maps of software downgrade definition SDD1 with an output software downgrade definition SDD_OUT. For example, discovery maps of software downgrade definition SDD1 and their relationships can be copied to output software downgrade definition SDD_OUT; i.e., SDD_OUT can be initialized to be a copy of SDD1. Block 682 also involves adding leaf discovery maps of SDD1 to a list of discovery maps DM_LIST. After adding leaf discovery maps of software downgrade definition SDD1 to DM_LIST, SDD1 may be marked as being searched.

Block 684 involves determining whether list DM_LIST is empty; e.g., determining whether any discovery maps are listed in DM_LIST. If no discovery maps are listed in DM_LIST, then DM_LIST can be determined to be empty and the search technique can proceed to block 692. Otherwise, DM_LIST can be determined not to be empty and the search technique can proceed to block 686.

Block 686 involves removing a discovery map DM1 from list DM_LIST and searching group of software downgrade definitions GS for one or more software downgrade definitions SDD2 in GS whose root discovery map is DM1. For example, block 686 can involve examining each root discovery map of the software downgrade definitions in group GS to determine whether a software package and version specified by discovery map DM1 matches a software package and version by a root discovery map of a software downgrade definition in group GS.

Block 688 involves determining whether one or more software downgrade definitions SDD2 were found during the search of group of software downgrade definitions GS at block 686 and whether at least one software downgrade definition of SDD2 is marked not searched. If one or more software downgrade definitions SDD2 were found at block 686 and if at least one software downgrade definition of SDD2 is marked not searched, the search technique can proceed to block 690. Otherwise, it can be determined that no non-searched software downgrade definitions were found at block 686, and the search technique can proceed to block 684.

Block 690 involves associating software downgrade definition SDD_OUT with leaf discovery maps of each software downgrade definition of SDD2 that is marked not searched. For example, let SDD2 have only one software downgrade definition that is marked not searched. Then, since discovery map DM is a discovery map in software downgrade definition SDD_OUT and a root node of the not-searched software downgrade definition of SDD2, SDD_OUT can be associated with the not-searched software downgrade definition of SDD2 by referring the discovery map DM in SDD_OUT to the not-searched software downgrade definition of SDD2 by utilizing discovery map DM in SDD_OUT as an intermediate discovery map. Block 690 also involves adding leaf discovery maps of each software downgrade definition of SDD2 that is marked not searched to list DM_LIST. After adding the leaf discovery maps to DM_LIST, block 690 can also involve marking each software downgrade definition in SDD2 as searched. Upon completion of block 690, the search technique can proceed to block 684.

Block 692 involves outputting software description definition SDD_OUT. In other examples, other and/or different outputs can be provided at block 692; e.g., a display that the search technique is complete, an indication that software description definition SDD_OUT is available. Upon completion of block 692, the search technique specified by flow chart 680 can end.

FIG. 7A shows user interface 700 for software model specifications, in accordance with example embodiments. In particular, user interface 700 as shown in FIG. 7A illustrates software model specification 650 discussed above. User interface 700 includes software model specification identifier field 710, software publisher field 712, software title field 714, software version field 716, root discovery map field 718, software downgrade definition field 720, delete button 730, add button 732, update button 734, update search button 736, and retrieve button 738. In other examples, user interface 700 can include more, fewer, and/or different fields and/or user interface elements; e.g., buttons, menus, displays, selectors, alerts, etc.

Software model specification identifier field 710 can be used to specify a name or other identifier for a software model specification. Software publisher field 712 can be used to specify a name or other identifier for a publisher or vendor of software modeled by a software model specification. Software title field 714 can be used to specify a name or other identifier for a software title and/or software package modeled by a software model specification. Software version field 716 can be used to specify information about a software version modeled by a software model specification. In some examples, software version field 716 can specified using a software version specified by a root discovery map of the software model specification.

Root discovery map field 718 can be used to specify and/or associate a root discovery map with a software model specification. In some examples, a software downgrade definition rather than a root discovery map can be associated with a software model specification; in these examples, a software downgrade definition specifier field can be used instead of root discovery map field 718. Software downgrade definition field 720 can provide information for a software downgrade definition whose root discovery map is specified by root discovery map field 718. The information for the software downgrade definition can include, but is not limited to, information about discovery maps and related software versions of the software downgrade definition.

In the depicted example, user interface 700 indicates that a software model specification identified as "SOFTWARE MODEL 650" models software published by "PUBLISHER1" entitled "SP1" and a version of "YEAR 4, LEVEL L1". The software model specification identified as "SOFTWARE MODEL 650" also has a root discovery map of "DMAP 602" with a related software downgrade definition for software package "SP1" that is associated with discovery maps "602", "604", "606", "608", "612", "614", "616", "642", "644", and "646". Details of these discovery maps and software downgrade definitions, including parent discovery map and version information (in terms of year of software package issue and software package level) are shown using user interface 700 and are discussed above in the context of FIGS. 6A and 6B.

In operation, an identifier for a software model specification can be input using software model specification identifier field 710. To retrieve a particular software model specification, the identifier for the particular software model specification can be input using software model specification identifier field 710 and the particular software model specification can be retrieved from storage in response to use of retrieve button 738. A retrieved software model specification can be deleted from storage using delete button 730. A new software model specification can be input using user interface 700; e.g., an identifier for the new software model specification can be input using software model specification identifier field 710; software publisher, application title, and version information can be input using software publisher field 712, software title field 714, and software version field 716 respectively; and a root discovery map for the new software model specification can be input using root discovery map field 718.

A search for a software downgrade definition whose root discovery map is specified by root discovery map field 718 can be initiated generally using update search button 736 or in the specific case of adding a new software model specification (i.e., where a new root discovery map is added) using add button 732. A search for a software downgrade definition based on a discovery map can be performed using the herein-described search techniques for searching discovery maps to find relationships between software downgrade definitions. Add button 732 can also cause a new software model specification to be saved to storage.

A retrieved software model specification can be updated using user interface 700; e.g., an identifier for the software model specification can be changed using software model specification identifier field 710 and/or a root discovery map can be changed using root discovery map field 718. Then, when the software model specification is done being updated, the updated software model specification can be saved to storage using update button 734. Other and/or additional user interface techniques than those described herein can be utilized by user interface 700.

FIG. 7B shows user interface 750 for entitlements, in accordance with example embodiments. In particular, user interface 750 as shown in FIG. 7B illustrates entitlement 660 discussed above. User interface 750 includes entitlement identifier field 760, license metrics fields 762A, 762B, license duration field 764, associated software model specification field 766, related software downgrade definition field 768, delete button 770, add button 772, update button 774, retrieve button 776, and selector 780. In other examples, user interface 750 can include more, fewer, and/or different fields and/or user interface elements; e.g., buttons, menus, displays, selectors, alerts, etc.

Entitlement identifier field 760 can be used to specify a name or other identifier for an entitlement. License metrics fields 762A and 762B can be used to specify license metric data for an entitlement, where license metrics field 762A can specify a count or number associated with license metrics for an associated software license associated with an entitlement presented using user interface 750, and where license metrics field 762B can specify license-metric units associated the associated software license; e.g., entities, sites, locations, users, processors, installations, processor cores. License duration field 764 can specify license duration data for the associated software license. Associated software model specification field 766 can specify a software model specification that is associated with the entitlement presented using user interface 750. Related software downgrade definition field 768 can list discovery map and related software downgrade definition information for a software package licensed using the software license In the depicted example, user interface 750 indicates that an entitlement identified as "ENTITLEMENT 660" represents a software license whose license metrics permit for "10" "USERS" for a "PERPETUAL" duration, and is associated with a software model specification "SOFTWARE MODEL 650" that specifies related software downgrade definition information for software package "SP1" that are associated with discovery maps "602", "604", "606", "608", "612", "614", "616", "642", "644", and "646". Details of the related software downgrade definition and discovery map information are shown using user interface 750 and are discussed above in the context of FIGS. 6A and 6B.

To retrieve a particular entitlement, the identifier for the particular entitlement can be input using entitlement identifier field 760 and the particular software model specification can be retrieved from storage in response to use of retrieve button 776. A retrieved entitlement can be deleted from storage using delete button 770. A new entitlement can be input using user interface 750; e.g., an identifier for the new entitlement can be input using entitlement identifier field 760, license metric data for the new entitlement can be input using license metrics fields 762A and 762B, license duration data can be input for the new entitlement using license duration field 764, a software model specification can be input for association with the new entitlement using associated software model specification field 766, and the new entitlement can be saved to storage in response to use of add button 772. When the new entitlement is added, an initialization operation such as initialization operation 670 discussed in the context of FIG. 6B can be carried out to link, copy, and/or otherwise reference discovery maps associated with the software model specification specified by associated software model specification field 766 to the new entitlement.

A retrieved entitlement can be updated using user interface 750; e.g., an identifier for the entitlement can be updated using entitlement identifier field 760, license metric data for the entitlement can be updated using license metrics fields 762A and 762B, license duration data for the entitlement can be updated using license duration field 764, a software model specification association for the entitlement can be updated using associated software model specification field 766, and the new entitlement can be saved to storage in response to use of add button 772. If associated software model specification field 766 is updated, an initialization operation can be carried out to link, copy, and/or otherwise reference discovery maps associated with the updated software model specification, such as initialization operation 670 discussed in the context of FIG. 6B.

Selector 780 can be used to select a discovery map of related software downgrade definition field 768. Once a discovery map is selected, user interface 750 can be used to perform one or more selection operations to add, remove, and/or update a version related to the selected discovery map, such as selection operations 672 and 674 discussed in the context of FIG. 6B In the example shown in FIG. 6B, selector 780 is located on a display of discovery map 646 of related software downgrade definition field 768, and so any selection operations performed for the entitlement in this example would be performed with respect to discovery map 646. When the entitlement is done being updated, the updated entitlement can be saved to storage using update button 774. Other and/or additional user interface techniques than those described herein can be utilized by user interface 750.

Figure 8:
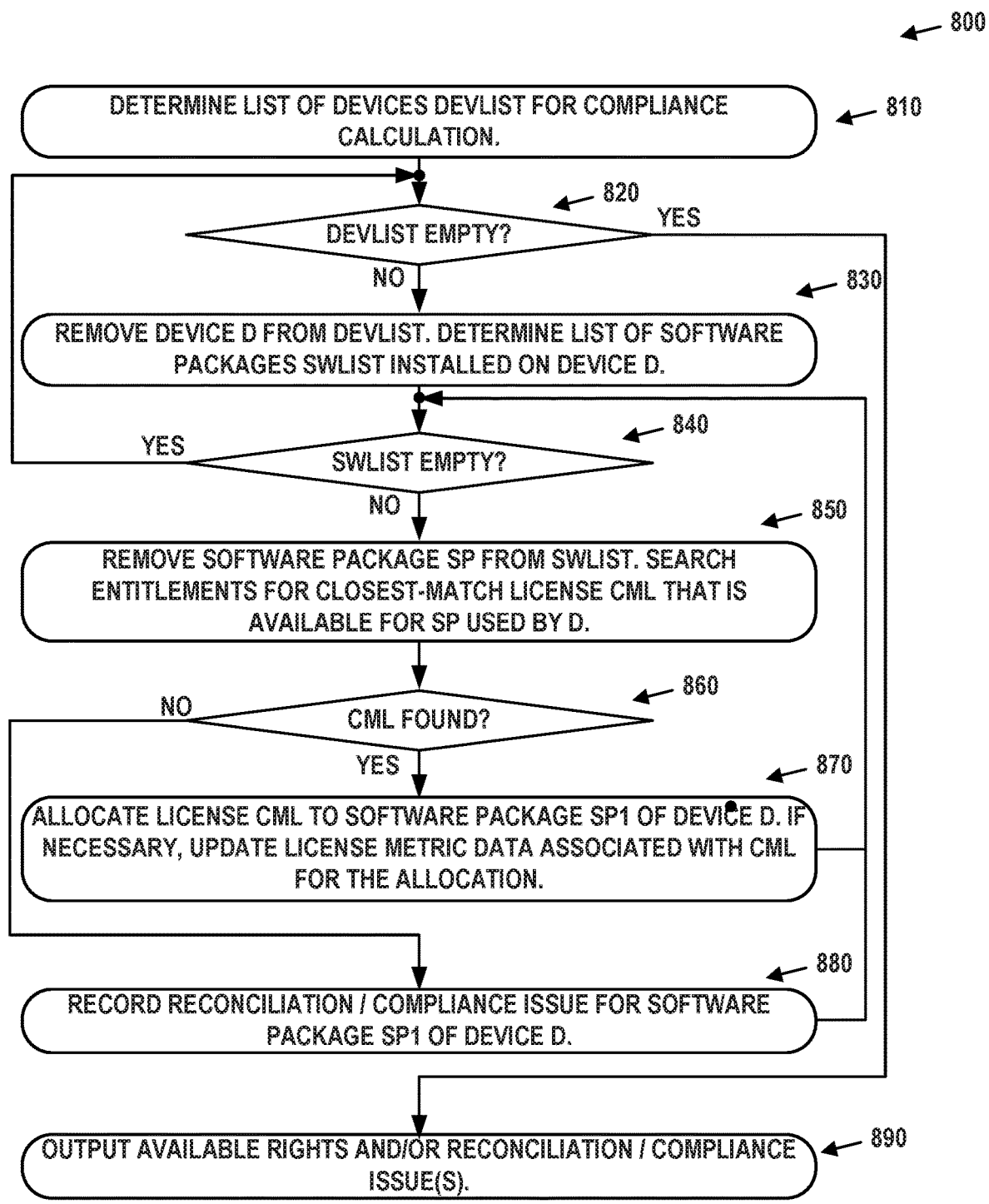
FIG. 8 is a flow chart, in accordance with example embodiments.

FIG. 8 is a flow chart 800, in accordance with example embodiments. Flow chart 800 relates to a technique for calculating compliance of installations of software packages with software licenses associated with one or more entitlements. The technique for calculating compliance illustrated by flow chart 800 may be carried out by a computing device, such as computing device 100, and/or a cluster of computing devices, such as server cluster 200. However, the technique for calculating compliance can be carried out by other types of devices or device subsystems. For example, the technique for calculating compliance could be carried out by a portable computer, such as a laptop or a tablet device. The embodiments of FIG. 8 may be simplified by the removal of any one or more of the features shown therein. Further, these embodiments may be combined with features, aspects, and/or implementations of any of the previous figures or otherwise described herein.

The technique for calculating compliance illustrated by flow chart 800 can begin at block 810. Block 810 involves determining a list of devices DEVLIST that are to be examined for the compliance calculation. For an example of managed network 300, DEVLIST can list one or more of client devices 302, server devices 304, routers 306, virtual machines 308, firewall 310, and/or proxy servers 312. Other example DEVLISTs are possible as well.

Block 820 involves determining whether list DEVLIST is empty; that is, determining whether any devices are listed in DEVLIST. If no devices are listed in DEVLIST, then DEVLIST can be determined to be empty and the technique for calculating compliance can proceed to block 890. Otherwise, DEVLIST can be determined not to be empty and the technique for calculating compliance can proceed to block 830.

Block 830 involves removing a device D from list DEVLIST and determining a list SWLIST of software packages installed on device D. For example, the computing device can look up, query, and/or otherwise examine software package installation information stored and/or otherwise associated with device D (e.g., stored in CMDB 500) to determine installed software packages to add to list SWLIST.

Block 840 involves determining whether list SWLIST is empty; that is, determining whether any software packages are listed in SWLIST. If no software packages are listed in SWLIST, then SWLIST can be determined to be empty and the technique for calculating compliance can proceed to block 820. Otherwise, SWLIST can be determined not to be empty and the technique for calculating compliance can proceed to block 850.

Block 850 involves removing a software package SP from list SWLIST and searching one or more entitlements for a closest-match license CIVIL that is available for allocation to software package SP installed on device D. Closest-match license CIVIL can be represented by a closest-match entitlement. A closest-match entitlement can be an entitlement that is associated with a smallest number of software downgrade definitions for an available software license for the software package SP installed on device D.

For example, suppose that N>1 entitlements E1, E2 . . . EN are entitlements for software package SP. Then, the closest match entitlement of entitlements E1, E2 . . . EN can be an entitlement whose software downgrade definition exactly matches the version of software package SP installed on device D. If none of entitlements E1, E2 . . . EN have a software downgrade definition that exactly matches the version of software package SP installed on device D, then the closest match entitlement of entitlements E1, E2 . . . EN can be an entitlement whose software downgrade definitions exactly match the installed version of software package SP installed on device D and that has a minimum number of software downgrade definitions for all entitlements E1, E2 . . . EN for software package SP. More specifically, suppose that version V2 of software package SP is installed on device D. Then, the closest match entitlement would be an entitlement that represents a software license for software package SP, version V2 without any other software downgrade definitions.

As another example, suppose that software package SP was originally installed on device D has having a version V2 but has since been downgraded to version V1; that is, software package SP has taken a downgrade path from version V2 to version V1 while being installed on device D. In this example, a closest match entitlement can be an entitlement whose software downgrade definition exactly matches the version and the downgrade path of software package SP installed on device D. For this example, the closest match entitlement would be an entitlement that represents a software license for software package SP, version V2 with only one software downgrade definition for software package SP, version V1.

If the closest match entitlement has license metric data that indicates that a software license is available for software package SP installed on device D; e.g., license metric data that includes, is but not limited to, a number of available rights for software package SP installed on device D that is greater than zero. In the case that the closest match entitlement has license metric data that indicates a software license is available for software package SP installed on device D, then the computing device can determine that closest-match license CML for software license for software package SP installed on device D has been found as the software license represented by the closest-match entitlement.

However, suppose that the closest match entitlement does not have license metric data that indicates that a software license is available for the installed version of the particular software package; e.g., license metric data that includes, is but not limited to, a number of available rights for the installed version of the particular software package that is zero (or less). Then the computing device can examine the other entitlements E1, E2 . . . EN than the closest match entitlement for software package SP for a possible closest match entitlement that has a minimum number of software downgrade definitions for all entitlements E1, E2 . . . EN for software package SP for a possible closest match entitlement.

In counting software downgrade definitions to determine the minimum number of software downgrade definitions, a number of discovery maps for a particular software downgrade definition can be counted. For example, software downgrade definition 600 shown in FIG. 6A can be considered to have four software downgrade definitions as software downgrade definition 600 is associated with four discovery maps: 602, 604, 606, and 608. As another example, software downgrade definition 654 shown at left of FIG. 6B can be considered to have ten software downgrade definitions as software downgrade definition 654 is associated with ten discovery maps: 602, 604, 606, 608, 612, 614, 616, 642, 644, and 646. Other examples of counting software downgrade definitions related to software downgrade definitions are possible as well.

If a possible closest match entitlement is found, the computing device determine whether the possible closest match entitlement has license metric data that indicates a software license is available for the installed version of the particular software package as discussed above to determine whether the possible closest match entitlement is usable. The computing device can continue searching for possible closest match entitlements until either a closest match entitlement is found or until all entitlements E1, E2 . . . EN than the closest match entitlement for software package SP have been considered as possible closest match entitlements without finding a closest match entitlement.

Block 860 involves determining whether closest-match license CML was found at block 850. If closest-match license CIVIL was found at block 850, then the technique for calculating compliance can proceed to block 870. If closest-match license CML was not found at block 850; e.g., if all entitlements E1, E2 . . . EN for software package SP were considered as possible closest match entitlements without finding a closest match entitlement, then the technique for calculating compliance can proceed to block 880.

Block 870 involves allocating closest-match license CML that is represented by the closest match entitlement found at block 850 to software package SP installed on device D and updating license metric data associated with closest-match license CIVIL as necessary. As one example, the closest match entitlement associated with closest-match license CML can have license metric data that CML is available for all installations throughout an entity; then, the computing device can determine that it is unnecessary to update license metric data of the closest match entitlement. As another example, the closest match entitlement associated with closest-match license CML can have license metric data that CIVIL is available for up to 10 installations; then, then, the computing device can update license metric data of the closest match entitlement; e.g., decrement a number of available installations/number of available rights by 1 due to the allocation of one installation of CIVIL to software package SP installed on device D.

In some examples, block 870 involves adding and/or updating reconciliation or compliance data, such as but not limited to, a log of reconciliation or compliance issues, to record the allocation of CIVIL to software package SP installed on device D The reconciliation or compliance data can include information about information about reconciliation or compliance issues found by the technique for calculating compliance, information about software package SP (e.g., a name, a vendor, a title, version information, other information about software package SP) and/or information about device D (e.g., a name of device D, a count of devices not having closest-match licenses for software package SP, a count of devices not having closest-match licenses for a version of software package SP installed on device D). Other information and/or techniques for recording reconciliation or compliance issues are possible as well. Upon completion of the procedures of block 870, the technique for calculating compliance can proceed to block 840.

Block 880 involves recording a reconciliation or compliance issue indicating that a closest-match license CML for software package SP installed on device D was not found. In some examples, block 880 involves adding and/or updating reconciliation or compliance data to record this reconciliation or compliance issue. The reconciliation or compliance data is described in more detail in the context of block 870. Upon completion of the procedures of block 880, the technique for calculating compliance can proceed to block 840.

Block 880 involves providing an output about reconciliation or compliance issues and/or reconciliation or compliance data regarding allocated software licenses determined by the technique for calculating compliance. Upon completion of block 890, the technique for calculating compliance can end.

VII. EXAMPLE OPERATIONS

Figure 9:
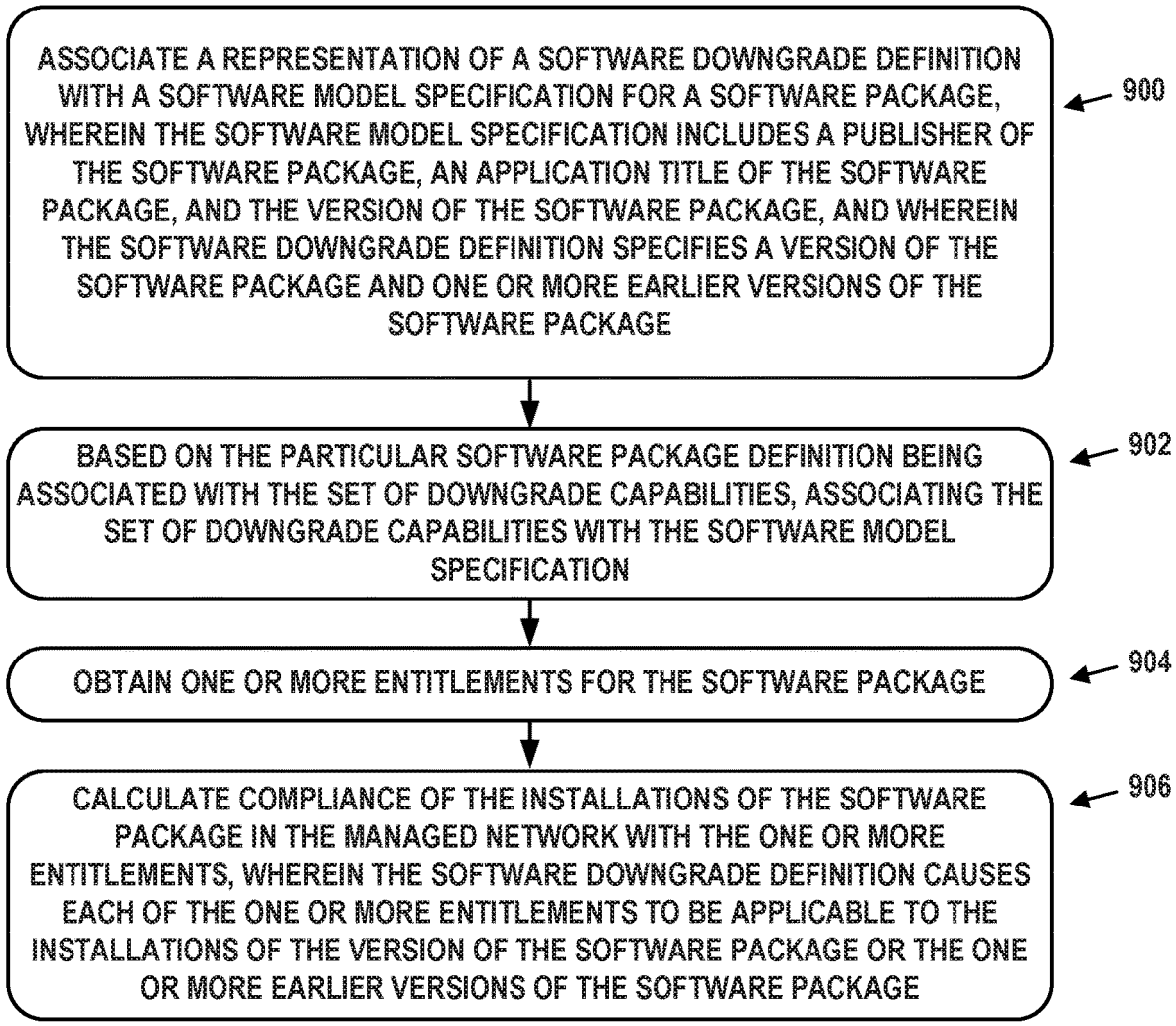
FIG. 9 is a flow chart, in accordance with example embodiments.

FIG. 9 is a flow chart, in accordance with example embodiments. A process illustrated by the flow chart of FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 may involve associating a representation of a software downgrade definition with a software model specification for a software package, wherein the software model specification includes a publisher of the software package, an application title of the software package, and a version of the software package, and wherein the software downgrade definition specifies a version of the software package and one or more earlier versions of the software package.

Block 902 may involve obtaining one or more entitlements for the software package.

Block 904 may involve associating the software downgrade definition with the one or more entitlements based on the software downgrade definition being associated with the software model specification.

Block 906 may involve calculating compliance of the installations of the software package in the managed network with the one or more entitlements, wherein the software downgrade definition causes each of the one or more entitlements to be applicable to the installations of the version of the software package or the one or more earlier versions of the software package.

In some examples, the one or more earlier versions of the software package are defined as versions of the software package that were released over a pre-determined period of time.

In some examples, the software downgrade definition includes one or more discovery maps specifying one or more earlier versions of the software package. These examples may further: involve removing a particular earlier version of the one or more earlier versions from the software downgrade definition by: (i) identifying a particular discovery map of the one or more discovery maps that specifies the particular earlier version, and (ii) removing the particular discovery map from the one or more discovery maps of the software downgrade definition.

In some examples, associating the representation of the software downgrade definition to the software model specification for the software package further comprises: determining a first earlier version of the one or more earlier versions of the software downgrade definition; performing a search of the plurality of software downgrade definitions for at least one searched-for software downgrade definition that is associated with the first earlier version of the software package and differs from the software downgrade definition; determining whether the search of the plurality of software downgrade definitions for the least one searched-for software downgrade definition is successful; and after determining that the search of the plurality of software downgrade definitions for the least one searched-for software downgrade definition is successful, associating the at least one searched-for software downgrade definition with the software model specification.

In some examples, the least one searched-for software downgrade definition comprises a second software downgrade definition, and wherein associating the representation of the software downgrade definition to the software model specification for the software package further comprises further comprises: associating the second software downgrade definition with the software model specification; determining a second earlier version of the one or more earlier versions of the second software downgrade definition, wherein the second earlier version differs from the first earlier version; performing a search of the plurality of software downgrade definitions for at least one second-searched-for software downgrade definition that is associated with the second earlier version and differs from the software downgrade definition and the second software downgrade definition; determining whether the search of the plurality of software downgrade definitions for at least one second-searched-for software downgrade definition that is associated with the second earlier version is successful; and after determining that the search of the plurality of software downgrade definitions for at least one second-searched-for software downgrade definition that is associated with the second earlier version is successful, associating the at least one second-searched-for software downgrade definition with the software model specification.

In some examples, calculating compliance of the installations of the software package in the managed network with the one or more entitlements comprises: identifying a particular installation of the software package in the managed network with a particular version that is not the version of the software package and is not one of the one or more earlier versions of the software package; and determining that the particular installation of the software package in the managed network is not in compliance with the one or more entitlements.

In some examples, calculating the compliance of the installations of the software package in the managed network with the one or more entitlements comprises: selecting a first computing device of the managed network, wherein the first computing device has an installation of the software package; determining an installed version of the software package on the first computing device; selecting a group of associated entitlements of the one or more entitlements for the software package, wherein each associated entitlement of the group of associated entitlements is associated with the installed version of the software package; selecting a closest-match entitlement of the group of associated entitlements based on software downgrade definitions of the group of associated entitlements, wherein the closest-match entitlement is associated with the installed version of the software package and is associated with a smallest number of software downgrade definitions of the group of associated entitlements; and determining whether a software license for the installed version of the software package is available based on the closest-match entitlement.

In some examples, selecting the closest-match entitlement of the group of associated entitlements comprises: determining whether the group of associated entitlements includes a candidate entitlement whose software downgrade definitions exactly match the installed version of the software package; and after determining that the group of associated entitlements includes the candidate entitlement whose software downgrade definitions exactly match the installed version of the software package, selecting the candidate entitlement as the closest-match entitlement.

In some examples, the closest-match entitlement comprises closest-match license metric data specifying availability of a software license associated with the closest-match entitlement, and wherein determining whether the software license for the installed version of the software package is available based on the closest-match entitlement comprises: determining whether the closest-match license metric data indicates that the software license associated with the closest-match entitlement is available for the installed version; and after determining that the closest-match license metric data indicates that the software license associated with the closest-match entitlement is available for the installed version: (i) determining that the software license associated with the closest-match entitlement is available for allocation to the installed version of the software package, and (ii) updating the closest-match license metric data for the closest-match entitlement to indicate that the software license associated with the closest-match entitlement has been allocated to the installed version.

In some examples, the closest-match entitlement comprises closest-match license metric data specifying availability of a software license associated with the closest-match entitlement, and wherein determining whether the software license for the installed version of the software package is available based on the closest-match entitlement comprises: determining whether the closest-match license metric data indicates that the software license associated with the closest-match entitlement is available for the installed version; and after determining that the closest-match license metric data indicates that the software license associated with the closest-match entitlement is not available for the installed version, attempting to select a different entitlement than the closest-match entitlement.

In some examples, attempting to select the different entitlement than the closest-match entitlement comprises: determining whether the group of associated entitlements includes a minimum entitlement that is associated with a minimum number of software downgrade definitions of the group of associated entitlements and has license metric data that indicates that a software license associated with the minimum entitlement is available for the installed version, wherein the minimum entitlement differs from the closest-match entitlement; and after determining that the group of associated entitlements includes the minimum entitlement: (i) determining that the software license associated with the minimum entitlement is available for allocation to the installed version of the software package, (ii) updating the license metric data for the minimum entitlement to indicate that the software license associated with the minimum entitlement has been allocated to the installed version, and (iii) selecting the minimum entitlement as the closest-match entitlement.

In some examples, attempting to select the different entitlement than the closest-match entitlement comprises: determining whether the group of associated entitlements includes a minimum entitlement that is associated with a minimum number of software downgrade definitions of the group of associated entitlements and has license metric data that indicates that a software license associated with the minimum entitlement is available for the installed version, wherein the minimum entitlement differs from the closest-match entitlement; and after determining that the group of associated entitlements does not include the minimum entitlement, determining that a software license for the installed version of the software package is not available.

In some examples, determining the installed version of the software package that is installed on the first computing device comprises determining that the installed version of the software package comprises a downgrade of a first version of the software package, and wherein selecting the group of associated entitlements of the one or more entitlements for the software package comprises selecting a first group of associated entitlements of the one or more entitlements for the software package as being associated with both the installed version of the software package and the first version of the software package.

In some examples, the one or more processors are further configured to: generate an output that reports compliance of the installations of the software package based on the one or more entitlements, wherein the output indicates whether a software license for at least one installed version of the software package is not available.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system, comprising:
   persistent storage containing: (i) a plurality of software downgrade definitions, wherein a software downgrade definition thereof specifies a version of a software package and one or more earlier versions of the software package, and (ii) representations of installations of the software package in a managed network; and
   one or more processors configured to:
      associate a representation of the software downgrade definition with a software model specification for the software package, wherein the software model specification includes a publisher of the software package, an application title of the software package, and the version of the software package;

obtain one or more entitlements for the software package;

based on the software downgrade definition being associated with the software model specification, associate the software downgrade definition with the one or more entitlements; and calculate compliance of the installations of the software package in the managed network with the one or more entitlements, wherein the software downgrade definition causes each of the one or more entitlements to be applicable to the installations of the version of the software package or the one or more earlier versions of the software package, wherein calculating the compliance of the installations of the software package in the managed network with the one or more entitlements comprises:

selecting a first computing device of the managed network, wherein the first computing device has an installation of the software package;

determining an installed version of the software package on the first computing device;

identifying a group of associated entitlements of the one or more entitlements for the software package, wherein each associated entitlement of the group of associated entitlements is associated with the installed version of the software package;

selecting a closest-match entitlement of the group of associated entitlements based on respective software downgrade definitions associated with each associated entitlement of the group of associated entitlements, wherein the closest-match entitlement comprises a smallest number of applicable versions of the software package, specified by its respective software downgrade definition, of the group of associated entitlements, wherein the closest-match entitlement comprises closest-match license metric data specifying availability of a software license associated with the closest-match entitlement; and determining whether a software license for the installed version of the software package is available based on the closest-match entitlement, wherein determining whether the software license for the installed version of the software package is available based on the closest-match entitlement comprises:

determining whether the closest-match license metric data indicates that the software license associated with the closest-match entitlement is available for the installed version; and in response to determining that the closest-match license metric data indicates that the software license associated with the closest-match entitlement is available for the installed version: (i) determining that the software license associated with the closest-match entitlement is available for allocation to the installed version of the software package, and (ii) updating the closest-match license metric data for the closest-match entitlement to indicate that the software license associated with the closest-match entitlement has been allocated to the installed version.

2. The computing system of claim 1, wherein the one or more earlier versions of the software package are defined as versions of the software package that were released over a pre-determined period of time.

3. The computing system of claim 1, wherein the software downgrade definition includes one or more discovery maps specifying one or more earlier versions of the software package, and wherein the one or more processors are configured to:

determine that a particular earlier version of the one or more earlier versions is not supported by at least one entitlement of the one or more entitlements; and remove the particular earlier version of the one or more earlier versions from the software downgrade definition associated with the at least one entitlement by: (i) identifying a particular discovery map of the one or more discovery maps that specifies the particular earlier version, and (ii) removing the particular discovery map from the one or more discovery maps of the software downgrade definition.

4. The computing system of claim 1, wherein associating the representation of the software downgrade definition to the software model specification for the software package comprises:

performing a search of the plurality of software downgrade definitions for at least one additional software downgrade definition that is: associated with an earlier version of the software package of the one or more earlier versions of the software package specified by the software downgrade definition; and differs from the software downgrade definition;

determining whether the search of the plurality of software downgrade definitions for the at least one additional software downgrade definition is successful, as yielding the at least one additional software downgrade definition; and in response to determining that the search of the plurality of software downgrade definitions for the at least one additional software downgrade definition is successful, associating the at least one additional software downgrade definition with the software model specification.

5. The computing system of claim 4, wherein associating the representation of the software downgrade definition to the software model specification for the software package comprises:

performing a second search of the plurality of software downgrade definitions for at least one second additional software downgrade definition that is: associated with a second earlier version of the software package of the one or more earlier versions of the software package; and differs from the software downgrade definition and the at least one additional software downgrade definition;

determining whether the second search of the plurality of software downgrade definitions for the at least one second additional software downgrade definition that is associated with the second earlier version is successful, as yielding the at least one second additional software downgrade definition; and in response to determining that the second search of the plurality of software downgrade definitions for the at least one second additional software downgrade definition that is associated with the second earlier version is successful, associating the at least one second additional software downgrade definition with the software model specification.

6. The computing system of claim 1, wherein calculating compliance of the installations of the software package in the managed network with the one or more entitlements comprises:

identifying a particular installation of the software package in the managed network with a particular version that is not the version of the software package and is not one of the one or more earlier versions of the software package; and determining that the particular installation of the software package in the managed network is not in compliance with the one or more entitlements.

7. The computing system of claim 1, wherein selecting the closest-match entitlement of the group of associated entitlements comprises:

determining whether the group of associated entitlements includes a candidate entitlement whose software downgrade definitions exactly match the installed version of the software package; and in response to determining that the group of associated entitlements includes the candidate entitlement whose software downgrade definitions exactly match the installed version of the software package, selecting the candidate entitlement as the closest-match entitlement.

8. The computing system of claim 7, wherein determining whether the software license for the installed version of the software package is available based on the closest-match entitlement comprises:

determining whether the closest-match license metric data indicates that the software license associated with the closest-match entitlement is available for the installed version; and in response to determining that the closest-match license metric data indicates that the software license associated with the closest-match entitlement is not available for the installed version, attempting to select a different entitlement than the closest-match entitlement.

9. The computing system of claim 8, wherein attempting to select the different entitlement than the closest-match entitlement comprises:

determining whether the group of associated entitlements includes a minimum entitlement that is associated with a minimum number of software downgrade definitions of the group of associated entitlements and has license metric data that indicates that a software license associated with the minimum entitlement is available for the installed version, wherein the minimum entitlement differs from the closest-match entitlement; and in response to determining that the group of associated entitlements includes the minimum entitlement: (i) determining that the software license associated with the minimum entitlement is available for allocation to the installed version of the software package, (ii) updating the license metric data for the minimum entitlement to indicate that the software license associated with the minimum entitlement has been allocated to the installed version, and (iii) selecting the minimum entitlement as the closest-match entitlement.

10. The computing system of claim 8, wherein attempting to select the different entitlement than the closest-match entitlement comprises:

determining whether the group of associated entitlements includes a minimum entitlement that is associated with a minimum number of software downgrade definitions of the group of associated entitlements and has license metric data that indicates that a software license associated with the minimum entitlement is available for the installed version, wherein the minimum entitlement differs from the closest-match entitlement; and in response to determining that the group of associated entitlements does not include the minimum entitlement, determining that the software license for the installed version of the software package is not available.

11. The computing system of claim 1, wherein determining the installed version of the software package that is installed on the first computing device comprises determining that the installed version of the software package comprises a downgrade of a first version of the software package, and wherein selecting the group of associated entitlements of the one or more entitlements for the software package comprises selecting a first group of associated entitlements of the one or more entitlements for the software package as being associated with both the installed version of the software package and the first version of the software package.

12. The computing system of claim 1, wherein the one or more processors are configured to:

generate an output that reports compliance of the installations of the software package based on the one or more entitlements, wherein the output indicates whether a software license for at least one installed version of the software package is not available.

13. A computer-implemented method, comprising:

associating a representation of a software downgrade definition of a plurality of software downgrade definitions with a software model specification for a software package, wherein the software model specification includes a publisher of the software package, an application title of the software package, and a version of the software package, and wherein the software downgrade definition specifies the version of the software package and one or more earlier versions of the software package;

obtaining one or more entitlements for the software package;

based on the software downgrade definition being associated with the software model specification, associating the software downgrade definition with the one or more entitlements; and calculating compliance of installations of the software package in a managed network with the one or more entitlements, wherein the software downgrade definition causes each of the one or more entitlements to be applicable to the installations of the version of the software package or to the one or more earlier versions of the software package, wherein calculating the compliance of the installations of the software package in the managed network with the one or more entitlements comprises:

selecting a first computing device of the managed network, wherein the first computing device has an installation of the software package;

determining an installed version of the software package on the first computing device;

identifying a group of associated entitlements of the one or more entitlements for the software package, wherein each associated entitlement of the group of associated entitlements is associated with the installed version of the software package;

selecting a closest-match entitlement of the group of associated entitlements based on respective software downgrade definitions associated with each associated entitlement of the group of associated entitlements, wherein the closest-match entitlement comprises a smallest number of applicable versions of the software package, specified by its respective software downgrade definition, of the group of associated entitlements, wherein the closest-match entitlement comprises closest-match license metric data specifying availability of a software license associated with the closest-match entitlement;

determining whether a software license for the installed version of the software package is available based on the closest-match entitlement; and in response to determining that the closest-match license metric data indicates that the software license associated with the closest-match entitlement is not available for the installed version:

determining whether the group of associated entitlements includes a minimum entitlement that is associated with a minimum number of software downgrade definitions of the group of associated entitlements and has license metric data that indicates that a software license associated with the minimum entitlement is available for the installed version, wherein the minimum entitlement differs from the closest-match entitlement; and in response to determining that the group of associated entitlements includes the minimum entitlement: (i) determining that the software license associated with the minimum entitlement is available for allocation to the installed version of the software package, (ii) updating the license metric data for the minimum entitlement to indicate that the software license associated with the minimum entitlement has been allocated to the installed version, and (iii) selecting the minimum entitlement as the closest-match entitlement.

14. The computer-implemented method of claim 13, wherein the one or more earlier versions of the software package are defined as versions of the software package that were released over a pre-determined period of time.

15. The computer-implemented method of claim 13, wherein associating the representation of the software downgrade definition to the software model specification for the software package comprises:

performing a search of the plurality of software downgrade definitions for at least one additional software downgrade definition that is: associated with an earlier version of the software package of the one or more earlier versions of the software package specified by the software downgrade definition; and differs from the software downgrade definition;

determining whether the search of the plurality of software downgrade definitions for the at least one additional software downgrade definition is successful, as yielding the at least one additional software downgrade definition; and in response to determining that the search of the plurality of software downgrade definitions for the at least one additional software downgrade definition is successful, associating the at least one additional software downgrade definition with the software model specification.

16. The computer-implemented method of claim 15, wherein associating the representation of the software downgrade definition to the software model specification for the software package comprises:

performing a second search of the plurality of software downgrade definitions for at least one second additional software downgrade definition that is: associated with a second earlier version of the software package of the one or more earlier versions of the software package; and differs from the software downgrade definition and the at least one additional software downgrade definition;

determining whether the second search of the plurality of software downgrade definitions for the at least one second additional software downgrade definition that is associated with the second earlier version is successful, as yielding the at least one second additional software downgrade definition; and in response to determining that the second search of the plurality of software downgrade definitions for the at least one second additional software downgrade definition that is associated with the second earlier version is successful, associating the at least one second additional software downgrade definition with the software model specification.

17. An article of manufacture including a non-transitory computer-readable medium, having stored thereon program instructions that, upon execution by a computing system, cause the computing system to perform operations comprising:

associating a representation of a software downgrade definition with a software model specification for a software package, wherein the software model specification includes a publisher of the software package, an application title of the software package, and a version of the software package, and wherein the software downgrade definition specifies the version of the software package and one or more earlier versions of the software package;

obtaining one or more entitlements for the software package;

based on the software downgrade definition being associated with the software model specification, associating the software downgrade definition with the one or more entitlements; and calculating compliance of installations of the software package in a managed network with the one or more entitlements, wherein the software downgrade definition causes each of the one or more entitlements to be applicable to the installations of the version of the software package or to the one or more earlier versions of the software package, wherein calculating the compliance of the installations of the software package in the managed network with the one or more entitlements comprises:

selecting a first computing device of the managed network, wherein the first computing device has an installation of the software package;

determining an installed version of the software package on the first computing device;

identifying a group of associated entitlements of the one or more entitlements for the software package, wherein each associated entitlement of the group of associated entitlements is associated with the installed version of the software package;

selecting a closest-match entitlement of the group of associated entitlements based on respective software downgrade definitions associated with each associated entitlement of the group of associated entitlements, wherein the closest-match entitlement comprises a smallest number of applicable versions of the software package, specified by its respective software downgrade definition, of the group of associated entitlements, wherein the closest-match entitlement comprises closest-match license metric data specifying availability of a software license associated with the closest-match entitlement;

determining whether a software license for the installed version of the software package is available based on the closest-match entitlement; and in response to determining that the closest-match license metric data indicates that the software license associated with the closest-match entitlement is not available for the installed version:

determining whether the group of associated entitlements includes a minimum entitlement that is associated with a minimum number of software downgrade definitions of the group of associated entitlements and has license metric data that indicates that a software license associated with the minimum entitlement is available for the installed version, wherein the minimum entitlement differs from the closest-match entitlement; and in response to determining that the group of associated entitlements does not include the minimum entitlement, determining that the software license for the installed version of the software package is not available.

* * * * *